United States Patent
Chong et al.

(10) Patent No.: US 12,554,843 B1
(45) Date of Patent: Feb. 17, 2026

(54) COLLABORATIVE HARDWARE-SOFTWARE TECHNIQUE FOR INCREASING RESILIENCE TO BIT-FLIPS

(71) Applicant: Amazon Technologies, Inc., Seattle, WA (US)

(72) Inventors: Nathan Yong Seng Chong, Ponte Vedra, FL (US); Dominic Phillip Mulligan, Cambridge (GB); Karimallah Ahmed Mohammed Raslan, Leander, TX (US); Hanno Becker, Comberton (GB)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 18/193,490

(22) Filed: Mar. 30, 2023

(51) Int. Cl.
*G06F 21/55* (2013.01)
*G06F 21/56* (2013.01)

(52) U.S. Cl.
CPC .......... *G06F 21/554* (2013.01); *G06F 21/567* (2013.01); *G06F 2221/034* (2013.01)

(58) Field of Classification Search
CPC . G06F 21/554; G06F 21/567; G06F 2221/034
See application file for complete search history.

(56) References Cited

U.S. PATENT DOCUMENTS

| | | | |
|---|---|---|---|
| 9,030,903 B2 | 5/2015 | Bains | |
| 10,108,365 B1* | 10/2018 | Bittlestone | G06F 12/145 |
| 10,528,736 B1 | 1/2020 | Sobel | |
| 10,950,288 B2 | 3/2021 | Nale | |
| 11,049,544 B2 | 6/2021 | Devaux | |
| 12,189,644 B1* | 1/2025 | Das | G06N 5/046 |
| 2012/0210095 A1* | 8/2012 | Nellans | G06F 12/1072 |
| | | | 711/E12.059 |
| 2017/0317889 A1* | 11/2017 | Moon | G06F 16/2365 |
| 2019/0056899 A1* | 2/2019 | Fukuoka | H04N 1/00915 |
| 2020/0012600 A1* | 1/2020 | Konoth | G06F 11/1068 |

(Continued)

FOREIGN PATENT DOCUMENTS

| | | |
|---|---|---|
| EP | 3591565 | 1/2020 |
| WO | 2019070195 | 4/2019 |

OTHER PUBLICATIONS

Yoongu Kim, et al., "Flipping Bits in MemoryWithout Accessing Them: An Experimental Study of DRAM Disturbance Errors," IEEE, 2014, pp. 1-12.

(Continued)

*Primary Examiner* — Linglan Edwards
*Assistant Examiner* — Jacob Benedict Knackstedt
(74) *Attorney, Agent, or Firm* — Robert C. Kowert; Kowert, Hood, Munyon, Rankin & Goetzel, P.C.

(57) ABSTRACT

A memory management unit (MMU) of a computing device obtains an indication that an algorithm is being used by a program to generate, for storage within a first subset of bits of an entry of an address translation data structure, a value generated from a second subset of bits of the entry. During a traversal of the data structure entry to perform a virtual-to-physical address translation, the MMU applies the algorithm to the second subset of bits. In response to determining that the result obtained from the algorithm by the MMU does not match the value stored in the first subset of bits, the MMU initiates a remedial action associated with bit-flips.

20 Claims, 16 Drawing Sheets

(56) References Cited

U.S. PATENT DOCUMENTS

| | | |
|---|---|---|
| 2020/0192742 A1 | 6/2020 | Boettcher et al. |
| 2020/0327390 A1* | 10/2020 | Lee .......................... G06N 3/04 |
| 2021/0064461 A1* | 3/2021 | Veches ................ G06F 11/1044 |
| 2021/0264980 A1 | 8/2021 | Sagron et al. |
| 2021/0264999 A1 | 8/2021 | Bains |
| 2021/0406384 A1 | 12/2021 | Jin |
| 2022/0020447 A1 | 1/2022 | Park |
| 2022/0129200 A1 | 4/2022 | Van Der Veen |
| 2022/0284096 A1* | 9/2022 | Gadhe ................... G06F 21/577 |
| 2023/0278210 A1* | 9/2023 | Yanagita ................ B25J 11/005 |
| | | 700/245 |
| 2024/0202139 A1* | 6/2024 | Botman .............. G06F 12/1491 |

OTHER PUBLICATIONS

U.S. Appl. No. 18/193,481, filed Mar. 30, 2023, Nathan Yong Seng Chong, et al.

* cited by examiner

Intended/original binary values 201 stored in a portion of memory (e.g., representing a data structure element in a program)

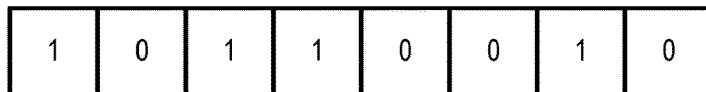

Bit-flip 205 (may occur at random bit positions due to natural causes such as cosmic radiation, power/ temperature fluctuations, etc. or due to malicious actions)

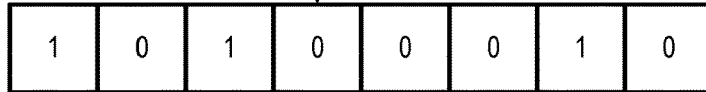

Modified binary values 209 resulting from bit-flip

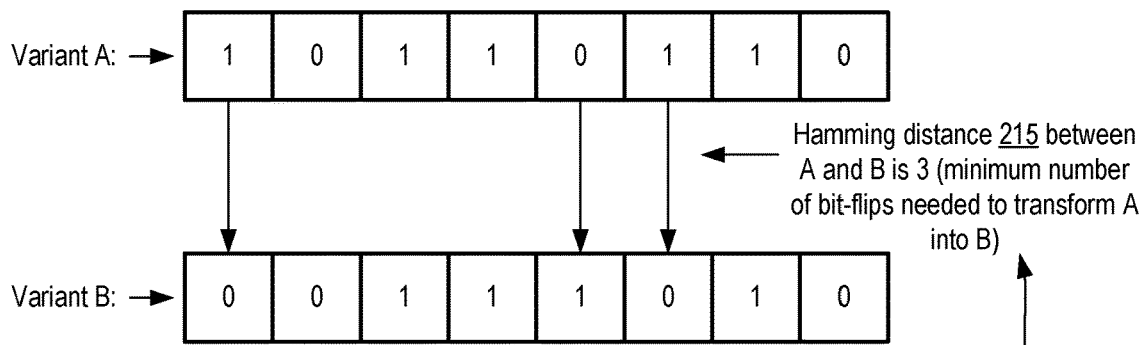

Hamming distance 215 between A and B is 3 (minimum number of bit-flips needed to transform A into B)

*The probability that a given legitimate/acceptable value in a program (such as A's value) is transformed to another legitimate/acceptable value (such as B's value) as a result of bit-flips decreases greatly as Hamming distance between the legitimate values increases*

FIG. 2

Section 302 of operating system source code

```
enum State {
        Invalid, // may be assigned the value 0b0000 by default
        Runnable, // may be assigned the value 0b0001
        Running // may be assigned the value 0b0010
};

// An array of process states used by the operating system

State processState[128];
```

306
Default Hamming distance between enum variants is 1

308
A single bit-flip could potentially change the apparent state of a process (e.g., from Invalid to Runnable, from Running to Invalid, etc.); two bit flips could change the apparent state from Runnable to Running 310
Even a small number of bit-flips can potentially lead to significant problems/crashes

*FIG. 3*

Compiler-introduced BFRE-related code modification examples 502

```
                                    502A
enum State {
// variants are assigned values selected based on BFRE params
        Invalid,
        Runnable,
        Running
};

// An array of process states used by the operating system
State processState[128];
…..
switch processState[i]  {
        case Invalid:
                // code section A written by programmer
                break;
        case Runnable:
                // code section B written by programmer
                break;
        case Running:
                // code section C written by programmer
                break;
502B    default:
                // instructions may be automatically inserted here
                // to log possible bit-flips and/or initiate remedial action

}
….

If (processState[i] !=Running) {
502C    // enum variant validity checking instructions may be inserted
        // at various other places in program, e.g., near code in which the enum
        // variants are written or read
        }
```

FIG. 5

COLLABORATIVE HARDWARE-SOFTWARE TECHNIQUE FOR INCREASING RESILIENCE TO BIT-FLIPS

BACKGROUND

Undesired modifications to data stored in the memory of computer systems can cause significant security issues (by changing the control flow of programs in an undetected manner) and application disruptions such as program crashes or hangs. Physical effects, such as alpha particles striking a memory cell, can cause such memory errors, referred to as bit-flips. Bit-flips can also be induced by certain types of attacks. Commonly-used memory protection techniques such as error correcting codes (ECC) can typically only correct single bit-flips and detect double bit-flips, but cannot detect more than two bit-flips.

BRIEF DESCRIPTION OF DRAWINGS

FIG. 2 illustrates the relationship between Hamming distance and the vulnerability of programs to memory errors involving the transformation of one legitimate value in memory to another legitimate value, according to at least some embodiments.

FIG. 3 illustrates an example use of enumerated (enum) data types to store important state information at a computing device, according to at least some embodiments.

FIG. 5 illustrates example types of program locations at which a compiler configured to enhance resilience against bit-flips may insert code during compilation, according to at least some embodiments.

Figure 1:
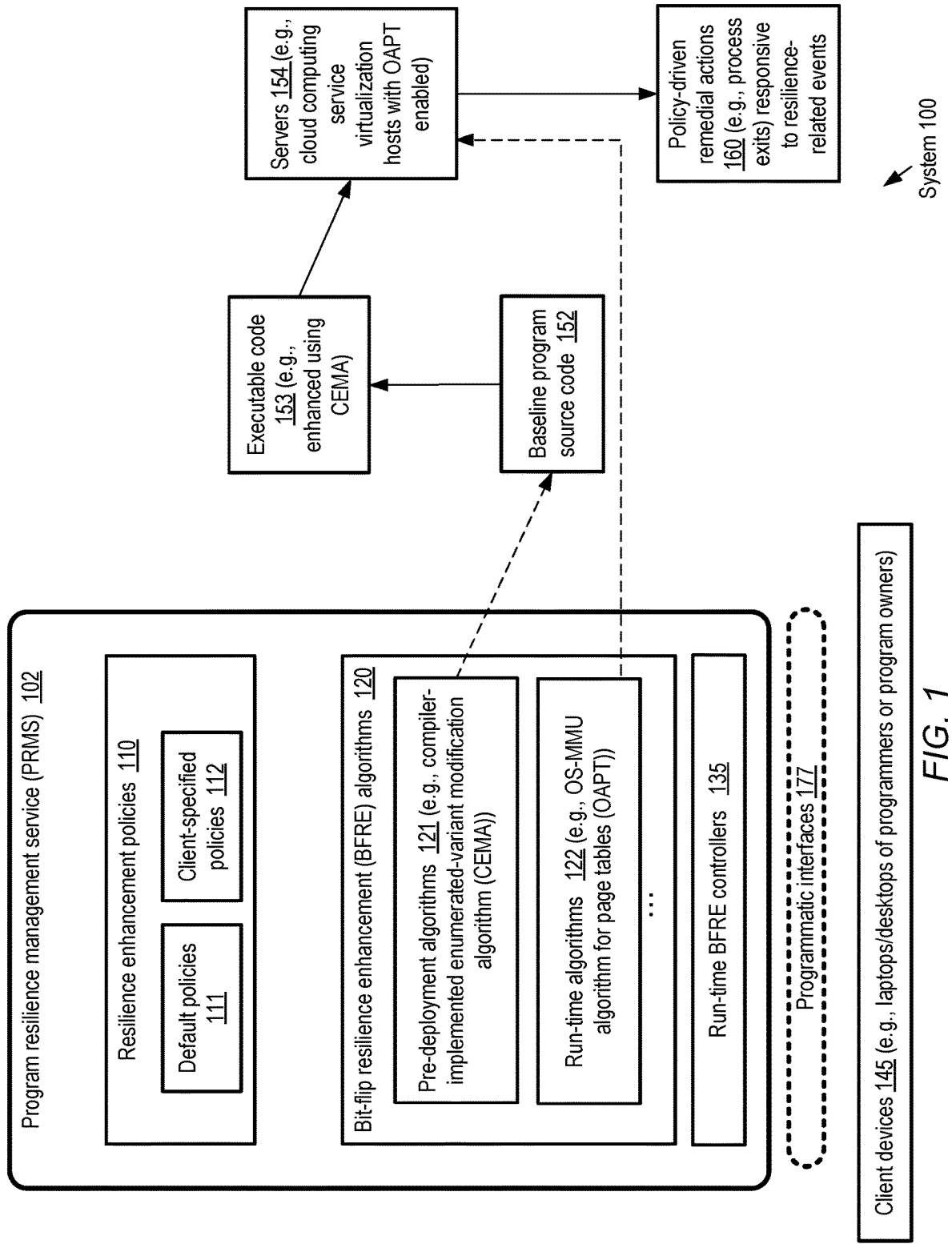
FIG. 1 illustrates an example system environment in which several types of techniques may be employed either independently or in combination at computing devices to enhance resilience of programs against bit-flips, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for enhancing the resilience of computing devices to the occurrence of bit-flips in the memories of the computing devices, for example by preventing undetected undesired operations that may otherwise occur as a result of bit-flips, by detecting potential bit-flips quickly and by initiating remedial actions upon the detection of bit-flips. A bit-flip is a change to the binary value stored in a bit within a portion of physical memory: a change of the value which was written to the bit from 0 to 1, or a change in the value from 1 to 0. Bit-flips can in general occur for a variety of reasons, such as high-energy particles landing on the memory due to cosmic rays or other electromagnetic radiation sources, fluctuations in temperature or power, or certain types of attacks directed to the computing devices. As the dynamic random access memory (DRAM) process technology (or the process technology used for other types of computer memory) scales down in size with advances in semiconductor fabrication techniques, in general it becomes more difficult to prevent memory cells from interacting electrically with one another, increasing the vulnerability of the memory cells to certain kinds of bit-flips. Bit-flips can sometimes result in serious problems, such as program crashes, prevention of access to memory to which access was granted earlier, or granting of access to memory to which access was intended to be denied, depending on the particular data structure whose value was modified or corrupted by the bit-flip(s). Memory protection techniques which are sometimes used for server-class systems in the industry, such as single error correction double error detection (SECDED) error-correcting codes (ECC) can only provide limited protection against memory corruption. As indicated by its name, SECDED ECC cannot detect more than two bit-flips in a portion of memory with ECC protection. Furthermore, such global memory protection techniques (techniques that attempt to protect the entire memory of the computing device, rather than specific subsets of the memory containing data which is critical to the functioning of the system) can be cost-prohibitive for certain types of devices.

Techniques that enable programs (such as application programs, operating system programs, or firmware, for example) to reduce the negative impact of the occurrence of bit-flips may be referred to as bit-flip resilience enhancement (BFRE) techniques herein. According to some embodiments, a compile-time BFRE technique may be employed to automatically modify the executable version of a set of software or firmware prior to deployment to enhance resilience. The software or firmware program may be modified by a compiler such that it requires a substantially higher number of bit-flips, relative to the number of bit-flips that would have been needed in the unmodified version, to cause one legitimate or acceptable value of a variant to be transformed into another legitimate value. Consider a scenario in which an enumeration data type (referred to in some programming languages as an "enum") has variants A, B and C, and from the programmer's perspective, the only legitimate option for a value stored in a critical data structure of a program is one of A, B and C. Depending on the programming language and compiler used, the default values assigned to A, B and C in the executable version of the program may be consecutive (e.g., A may be assigned the value 0, B may be assigned the value 1, and C may be assigned the value 2). A single bit-flip can change the binary string representing the value 0 (e.g., "00000000" if 8 bits are being used) to 1 ("00000001") or vice versa, or to change the binary string representing 2 ("00000010") to 0 or 0 to 2. As a result, if a single bit-flip happens to occur in a portion of memory being used for a data structure field in which the enumeration is being used, one legitimate value from the enum may be changed to another, and the program behavior may potentially be modified significantly.

In various embodiments, the compiler-based BFRE technique proposed herein may automatically select values for variants such as A, B and C, such that more (e.g., at least four) bit-flips would be required to transform one legitimate value to another, thereby reducing the probability that one legitimate value can be changed to another as a result of bit-flips. Furthermore, in at least some embodiments, the compiler-based BFRE technique may also be able to insert code at various places in a program to check whether the value of a variant is among the legitimate ones chosen by the compiler, or is an illegitimate value. If an illegitimate value is found, the inserted code may be able to initiate a responsive remedial action selected based on a policy (e.g., a policy specified by the programmer, or a policy chosen by the owner or user of the computing device in question) in some embodiments, such as pausing or halting the execution of the program instead of allowing the program to continue execution in an unintended manner.

Some programming languages (such as Python) and scripting languages (such as Ruby) do not require entire programs to be transformed into executable machine language by a compiler in advance of execution. Instead, when a program is to be executed, software referred to as an interpreter may translate the source code of the program into an intermediate representation or object format and execute the translated version immediately. An interpreter may, for example, translate small portions of the source code (e.g., a line at a time) and execute the translated versions before the remainder of the code has been examined or translated. Interpreters and compilers may collectively be referred to as program translators or program transformers. For some programming languages, both interpreters and compilers may be used. In at least some embodiments, BFRE techniques similar to the compiler-implemented technique introduced above may be implemented by interpreters. That is, in such embodiments, interpreters may take inter-variant Hamming distances into account when selecting variant values.

According to other embodiments, a BFRE technique which involves collaboration between software programs and hardware components of a computing device may be used to protect page tables and other similar critical data that are (a) written to by software programs and (b) frequently traversed or accessed by the hardware components during normal operations of the computing device. In computing systems that use virtual memory, a page table may comprise information about mappings between virtual address and physical address. Page tables are often implemented as hierarchical data structures, traversed by hardware memory management units (MMUs) when a virtual-to-physical address translation is required, and such address translations may typically have to be performed at very high rates. Page table entries may typically be written to by virtual memory management programs (MMPs) of the operating system, e.g., when a new process is launched or a memory map/unmap system call is issued. The term "operating system", as used herein, refers to any type of privileged system software that manages page tables. In some embodiments, for example, such privileged system software may be implemented as part of a hypervisor of a computing device used to run virtual machines, instead of in a traditional operating system of an un-virtualized computing device. MMPs may also be referred to as memory management components (MMCs), memory management subsystems (MMSs), or virtual memory managers (VMMs) of the operating system. A given page table entry may comprise not just address information, but also attributes (such as access permissions) of a memory page (or a group of pages) and usually contains some unused or reserved bits (reserved, for example for potential "future use" according to the hardware architecture being implemented at the computing device). If attributes such as access permissions are modified as a result of one or more bit-flips, the intended behavior of the system may be changed drastically—e.g., some processes which were legitimately allowed to access a portion of memory may be unexpectedly denied permission to that portion of memory, and so on. If the address stored in a page table entry were to be modified, this can lead to corrupted address translations, so the wrong page of memory may be read or written.

In the proposed collaborative hardware-software technique, in various embodiments a decision may be made by the operating system, e.g., based on policies selected/obtained at the operating system, that a certain subset of the bits being used for a page table entry (or other data structures that may also be traversed or accessed frequently by hardware components such as MMUs during normal operations) are to be made more resilient to bit-flips. The operating system program (such as an MMP) writing values to the to-be-protected bits of a given page table entry may then compute, from the values which it writes into the to-be-protected bits, a derived value (logically similar to a checksum or parity value) which can be stored in reserved bits of the same page table entry. A communication mechanism (such as one or more processor registers) may be used by the operating system program to inform a hardware component of the device, such as an MMU, about the bits being protected and the transformation algorithm being used to derive the value from the protected bits in various embodiments. During its normal traversals of the page table, the hardware component may subsequently apply the same transformation algorithm to the same subset of bits, and check whether the value currently stored in the reserved bits matches the result obtained by the hardware component. If the result does not match, this may indicate that a bit-flip may have occurred (e.g., either in the protected bits or in the reserved bits), and a remedial action such as a processor interrupt may be initiated by the hardware component. As such, the probability of detecting bit-flips in the protected portions of the frequently-traversed data structure may be increased, and actions may very quickly be initiated to respond to potential bit-flips in such portions of memory. The hardware-software collaborative BFRE technique may be turned off dynamically at run-time if desired in various embodiments, e.g., by issuing the equivalent of a system call. The compiler-based BFRE technique and the collaborative technique may be employed together if desired, or only one of the techniques may be implemented. In scenarios in which one or both techniques are being employed, log records of the detection of potential bit-flips may be generated, which can be utilized for debugging if desired. Debugging problems that result from bit-flips may be difficult, so obtaining log records that point to the occurrence of bit-flips may be useful.

As one skilled in the art will appreciate in light of this disclosure, certain embodiments may be capable of achieving various advantages, including some or all of the following: (a) reducing the probability of unintended/undesired program behaviors resulting from bit-flips, and/or (b) simplifying debugging tasks at computer systems.

According to some embodiments, a system may include one or more computing devices. The one or more computing devices may store instructions that upon execution on or across the one or more computing devices determine, at a compiler, that a particular program whose resiliency against bit-flips is to be enhanced comprises a data structure within which a value of a variant selected from a plurality of variants of an enumeration data type (or some other data type whose instances can take on values from a plurality of variants or labeled constants) is going to be stored during execution of the program. The compiler may select a respective value for individual variants of the plurality of variants, including a first value for a first variant and a second value for a second variant, such that a Hamming distance between the first value and the second value exceeds a threshold determined by the compiler in some embodiments. The compiler may generate a compiled (executable) version of the program and cause the compiled version to be stored. During an execution of the compiled version of the program, in one embodiment, one or more checks may be conducted (e.g., using instructions inserted into the compiled version by the compiler) to determine whether a value stored in the data structure matches one of the values which were selected by the compiler. If the check detects that a particular value stored in the data structure does not match one of the selected values, this may be considered an indication that one or more bit-flips have corrupted the contents of the data structure. A remedial action associated with the detection of occurrence of one or more bit-flips may then be initiated (e.g., by additional executable instructions introduced into the executable program by the compiler) in at least some embodiments.

In at least some embodiments, hints pertaining to bit-flip resilience enhancement (BFRE) may be provided to the compiler, e.g., by a programmer or program owner. For example, a configuration setting of the compiler (implemented via a compiler flag such as "-bfre", or via an environment variable) may be used to provide an indication to the compiler that the resilience of one or more programs to be compiled using the compiler is to be enhanced in one embodiment. In some embodiments, such a configuration setting may be used to request that the compiler apply its BFRE algorithm to all the source code files of an entire source code tree. In another embodiment, a more selective approach to the use of the compiler's BFRE algorithm may be taken. Programmers may introduce compiler directives or hints (such as pragmas) into selected source code files, delineating the portion(s) of the code within which the BFRE algorithm is to be applied (i.e., within which values for the variants of an enum are to be selected by the compiler such that the Hamming distance between pairs of different variants exceeds a minimum threshold). In some embodiments, a programmer may use such compiler directives to indicate the specific data structures whose elements are intended to take on variant values (and thus may need to be made more resilient against bit-flips), while in other embodiments a programmer may provide directives indicating the enums for which the BFRE algorithm should be utilized, or provide directive identifying both the enums and the data structures which use the enums. In effect, such compiler directives/hints may be used to indicate to the compiler that values of one or more sets of variants should be selected by the compiler to enhance bit-flip resilience.

A number of approaches may be taken by a compiler to decide the specific values which are to be assigned to individual variants. For example, a formula or algorithm (which takes into account the values that have already been assigned, if any, to other variants for the particular enum instance being considered) may be used to generate the values dynamically for each variant in one embodiment. In one example implementation, an algorithm that uses a sequence of left-shifts may be utilized to generate the values. In such an implementation, if a minimum Hamming distance of N is desired for variant values which are stored using M bits each, a mask K may be set to (1<<N)−1 (where the symbol << denotes a left shift), and the variant values may be set to 0, mask, (mask<<N), (mask<<2N), etc. If M=32 and N=4, (so that a minimum Hamming distance of 4 is desired between variants), the variant values may be set to 0, 0xf, 0xf0, 0xf00, 0xf000 etc.

According to at least one embodiment, a client on whose behalf a program is to be compiled (such as a customer of a software development and deployment service of a cloud provider network which supports BFRE-capable compilers) may provide an indication of the particular algorithm or formula to be utilized at the compiler via one or more programmatic interfaces, e.g., as part of a compiler-related BFRE policy selected by the client, or as part of a configuration setting. Other aspects of such a policy may indicate the portion of a source code tree for which compiler-based BFRE is to be performed, e.g., whether the compiler's BFRE algorithm is to be applied to the entire tree or to specified portions of the tree (e.g., sub-trees which define and use certain critical data structures), or whether hints or directives are to be used to determine which portions of the source code are to be compiled for BFRE. In one embodiment, instead of computing values for the variants of various enums using a formula or mathematical algorithm, the compiler may simply use values from a pre-defined or pre-computed set of values for which the inter-value minimum Hamming distance satisfies a criterion. For example, a set of values such as 0, 0xf, 0xf0, 0xf00, ... from the above example may be pre-computed or prepared before the compiler actually accesses or processes the source code of the program whose resilience is to be enhanced, passed to the compiler via a configuration setting (such as the name of a file in which the values are written) and used for all 32-bit enum variants.

According to at least some embodiments, a compiler may be provided an indication of the kinds of remedial actions to be taken in the event that a potential bit-flip is detected using the approach described above. Executable code implementing the desired remedial actions may then be generated and inserted into the executable version of the program by the compiler. The remedial action may, for example, comprise one or more of: causing a warning or error message indicating a potential occurrence of a bit-flip to be delivered to one or more destinations, pausing execution of the program in which the bit-flip appears to have occurred, or causing termination of execution of the program. In some embodiments, the compiler may insert executable code to implement a default remedial action if input is not provided by the programmer or program owner.

Some programming languages allow programmers to control the values to be assigned to individual variants of an enum, e.g., either by specifying the values or by specifying relationships between the values. For example, an enum E1 that has three variants a, b and c may be defined as the equivalent of the following: enum E1 {a=10, b=12, c=14} or enum E1={1, b=a+10, c=b+25}. In the second of these examples, while the programmer does not specify the value to be assigned to a, the programmer has indicated relationship requirements for the values assigned to a, b, and c (that b would exceed a by 10, and that c should exceed b by 25). In at least some embodiments, when deciding which sets of variants are to be assigned values taking BFRE into account, the compiler may decide that for those enums for which such details are provided by the programmer, the variant values are not going to be overridden or selected by the compiler—that is, the programmer's selected values or inter-variant value relationships may be left unchanged. In some embodiments, e.g., based on input from the programmer/client, a static analysis of the source code being considered for BFRE may be performed by the compiler, and the programmer/client may be provided an indication via a programmatic interface that the value of a variant cannot be set by the compiler without overriding a programmer-selected value for that variant. Such a notification may in effect inform the client that those data structures in which values of such enum variants (for which the programmer has provided constraints) will not be modified by the compiler for BFRE purposes.

In at least some embodiments, values with large Hamming distances separating them may be assigned to the two Boolean variants ("true" and "false") by a compiler. As such, the use of the technique for separating variant values to reduce the probability of inadvertent transformations due to bit-flips may be extended beyond enum data types in such embodiments. In general, the technique may be applied in a variety of scenarios in which sets of symbolic constants are used to populate data structures or variables.

In various embodiments, data structures at any of several layers of the firmware/software stack may be protected against bit-flips using the compiler-based approach introduced above. Such data structures may for example include operating system process state data structures (in which information about the states of processes running at the computing device may be stored), data structures used for translation of virtual to physical addresses, and/or data structures of an application being run in user mode.

According to some embodiments, a system may comprise a memory management program (MMP) of an operating system of a computing device, and a hardware memory management unit (MMU) of the computing device. The MMP may be configured to identify a first subset of bits of a particular data structure element or entry (such as a page table entry), wherein resilience of the first subset of bits to bit-flips is to be enhanced, and wherein the particular data structure element is included within an address translation data structure comprising a plurality of data structure elements that are traversed by the MMU to perform virtual-to-physical address translations. The MMP may store, within the first subset of bits, a first value selected in accordance with a memory management algorithm of the computing device. In addition, in various embodiments, the MMP may store, within a second subset of bits of the same data structure element, a second value derived from the first value using a transformation algorithm. The second subset of bits may, for example, comprise a set of reserved or unused bits defined in a hardware architecture specification of the computing device. As such, bits which are not being used for any other purpose may be dedicated to storing values derived from the to-be-protected portion of the data structure element by the MMP in such embodiments.

The MMU of the computing device may be configured to obtain an indication that the transformation algorithm is being used by the MMP to generate and store values (derived from the first subset of bits) in the second subset of bits. During at least some traversals of the data structure entry, performed by the MMU for a virtual-to-physical address translation or other tasks requested/triggered by the operating system, the MMU may apply the transformation algorithm to the first subset of bits in various embodiments. If the result obtained by the MMU differs from the value currently stored in the second subset of bits, this discrepancy may indicate that one or more bit-flips have occurred and changed the value stored in the first subset of bits, the value stored in the second subset of bits, or the values stored in both subsets of bits. In some embodiments, in response to detecting that the value stored in the second subset of bits does not match the value generated by the MMU using the algorithm, the MMU may cause a remedial action associated with a detection of a bit-flip to be initiated. Such remedial actions may, for example, comprise generating an interrupt at a processor (e.g., a CPU) of the computing device. The initiation of the remedial action may result in a pause in execution of the operating system, an exit or termination of the programs being run at the computing device, logging/reporting/notification of the detection of the discrepancy, and/or other operations in different embodiments.

The technique in which the MMP and MMU implement the above-described operations may be referred to as a collaborative hardware-software technique for BFRE. The collaborative technique may be dynamically (e.g., at runtime, without requiring any changes to the programs running at the computing device) disabled or enabled in any of several ways in various embodiments. For example, a user or client of the computing device may send a programmatic request (similar to a system call) to the operating system to disable or enable the implementation of the technique. In response to receiving such a programmatic request, the operating system may provide an indication to the MMU (e.g., using a hardware processor register of the computing device) that the MMU is not to perform the computations to check whether the value stored in the second subset of bits matches an expected value. The MMU may then stop performing its portion of the algorithm (in which it checks whether the value in the second subset of bits matches the value the MMU generates using the transformation algorithm). In at least some embodiments, if such a request is received, the operating system itself may stop writing the derived values in the second subset of bits. In one embodiment, in a variant of the above disable workflow, while the MMU may be instructed by the operating system to stop checking the derived value, the operating system itself may continue writing the derived value into second subset of bits of the data structure entries. If/when a programmatic request is received to start/enable the collaborative algorithm at a point in time at which the collaborative algorithm is disabled, in one embodiment the operating system may first start generating and storing the derived values, and then notify the MMU to start its checking of the values.

In at least some embodiments, one or more processor registers may be utilized for communication, pertaining to the collaborative hardware-software BFRE technique, between the operating system and the MMU. Such registers may be used, for example, to indicate the particular algorithm being employed to derive the values, the specific set of bits (identified by bit indexes/offsets) in which the derived values are stored by the operating system, and so on. In one embodiment, the frequency with which the MMU checks on the derived values may be modified using such registers—e.g., instead of checking the value each time the MMU traverses a page table entry, the MMU may be requested to check the value once every N traversals, where N is a tunable parameter which may be specified in a BFRE policy, selected by an administrator or user of the computing device, pertaining to the collaborative technique.

The subset of bits that are protected using the collaborative hardware-software technique may be selected for a variety of reasons in different embodiments. In some embodiments, for example, the subset of bits may be selected for BFRE because they store attributes of page table entries (such as memory page access permissions) that are considered critical with respect to correct behavior of the computing device. In some embodiments, e.g., because the "extra" computations to generate the derived values may tend to slow down the system somewhat, only a relatively small subset of bits may be protected, e.g., based on a client-selected BFRE policy. Any of a variety of transformation algorithms may be used in some embodiments to generate the derived values, such as checksum algorithms, parity algorithms and the like.

The collaborative hardware-software technique introduced herein may be employed at a computing device independently of conventional memory protection techniques such as ECC. In some embodiments, for example, the collaborative technique may be implemented at a computing device at which ECC-protected memory is employed for various memory sub-units. In such an embodiment, for each sub-unit of memory, a corresponding hardware-generated error correction code (separate from the derived values generated by the MMP) may be generated and stored, so that the benefits of both ECC and the collaborative techniques are obtained. In other embodiments, the collaborative technique may be employed at a computing device which does not utilize ECC for its memory. In some embodiments, the hardware portion of the collaborative hardware-software technique (the checking of the transformed values which stored by the software) may be performed by hardware units other than MMUs. For example, some microcontroller-based systems may comprise memory protection units (MPUs) which can be configured to implement the hardware portion of the technique. In at least some embodiments, the collaborative technique may be used in combination with the compiler-based technique for BFRE described above; in other embodiments, the collaborative technique may be used while the compiler-based approach is not used, or the compiler-based approach may be used without using the collaborative technique.

In some embodiments, one or both of the techniques may be employed at virtualization servers of a computing service of a cloud provider network, thereby further strengthening the robustness and fault-resilience of virtual machines offered to clients of the cloud provider network. A cloud provider network (sometimes referred to simply as a "cloud" or a cloud computing environment) refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

FIG. 1 illustrates an example system environment in which several types of techniques may be employed either independently or in combination at computing devices to enhance resilience of programs against bit-flips, according to at least some embodiments. System 100 may comprise resources and artifacts of a program resilience management service (PRMS) 102, which may for example be implemented as one of a suite of network-accessible services of a cloud provider network in some embodiments. Clients or customers of the PRMS, such as programmers developing applications or system software, or program owners, may utilize programmatic interfaces 177 to indicate the kinds of resilience enhancement techniques they wish to utilize, and if desired to provide policies specifying various parameters applicable to the techniques. Programmatic interfaces 177 may include, for example, application programming interfaces (APIs), command-line tools, graphical user interfaces, web-based consoles and the like in different embodiments. The requests and associated policies/parameters may be submitted from client devices 145, such as laptops/desktops of programmers or program owners. Resilience enhancement policies 110 stored at the PRMS may include a set of default policies 111 (used on behalf of clients who do wish to utilize the resilience enhancement techniques but do not wish to provide specific policies) as well as client-specified policies 112 (policies chosen or customized by individual clients of the PRMS) in the depicted embodiment.

Several classes of tools may be supported by PRMS 102 for increasing program resilience in some embodiments, including BFRE algorithms 120 of at least two kinds: pre-deployment algorithms 121 and run-time algorithms 122. The pre-deployment algorithms 121 may include a compiler-implemented enumerated-variant modification algorithm (CEMA), and the run-time algorithms 122 may include a collaborative hardware-software algorithm referred to as an OS-MMU (operating system-memory management unit) algorithm for page tables (OAPT) in the depicted embodiment. Some clients of the PRMS may choose to utilize the CEMA to prepare enhanced-resilience executable versions of their programs, e.g., by submitting compilation requests and associated CEMA policies via the programmatic interfaces. Other clients may choose to utilize the OAPT at run-time to detect potential corruption in page tables, e.g., by submitting requests to enable, disable, or change configuration settings of (e.g., by varying the rate at which the MMUs perform checks of the values derived from protected portions of the page tables) the collaborative technique. Requests pertaining to the run-time collaborative technique, submitted by clients via the programmatic interfaces 177, may be processed initially by run-time BFRE controllers 135 in the depicted embodiment. The controllers may then send messages to the operating systems of the servers 154 at which the OAPT is being implemented on behalf of the client in some embodiments, and the operating systems may in turn send messages/signals/notifications to the MMUs. Both the CEMA and the OAPT may be employed by some clients in the depicted embodiment. Note that while FIG. 1 shows bit-flip resilience enhancement algorithms as being implemented with the help of a PRMS, in some embodiments one or both of the algorithms may be implemented without utilizing such a service, e.g., at stand-alone computing devices.

In accordance with the CEMA, baseline program source code 152 of one or more programs of a client may be transformed by a compiler into executable code 153 which has been enhanced by the compiler to protect at least some data structures which use enumerated variants (such as enums) against negative outcomes resulting from bit-flips. The compiler may for example determine whether the programs to be made more resilient against bit-flips include data structures whose values are selected from a plurality of such variants, and select respective values for the variants such that the Hamming distance between any two of the variants exceeds a threshold in the depicted embodiment. Executable code 153 generated from the programs by the compiler may include the specially-selected variant values. The executable code may then be deployed for execution at servers 154 (or more generally, at any computing device capable of executing the code). If, during execution of the code, a determination is made that a value of a variant does not match one of the compiler-selected values, a remedial action associated with a potential occurrence of one or more bit-flips (such as pausing/terminating execution of the program, generating a log message, etc.) may be initiated in various embodiments. Policy-driven remedial actions 160 may be performed in some embodiments, based on the preferences indicated by clients in resilience enhancement policies.

A subset or all of the servers 154 (such as cloud computing service virtualization servers) used for running clients' programs may have the OAPT enabled in the depicted embodiment. According to the OAPT, an operating system memory management program (MMP) may select a subset of bits of page table entries which are to be made more resilient to bit-flips. When the MMP writes data into these to-be-protected bits, during implementation of memory management algorithms of the operating system, it may also derive a value from the data using a transformation function, and store the derived value in a second subset of bits of the page table entries. The second subset may include "reserved" or unused bits of the page table entries, as indicated in a hardware architecture specification (e.g., a CPU architecture specification, published by the designer/manufacturer of the CPU or by an industry consortium) of the server. The hardware MMU of the server may be notified that the transformation algorithm is in use by the MMP, e.g., via one or more processor registers. In some implementations, a number of algorithm choices for the transformation function may be specified in the architecture specification, and the MMP may choose one of the options and program a processor register accordingly. During at least some of its traversals of the page table, which typically occur quite frequently, the MMU may apply the same transformation function to the values stored in the first subset of bits of a given page table entry, and check whether the value stored earlier in the second subset of bits matches the result the MMU obtains. If the results do not match, a remedial action 160 may be initiated in at least some embodiments, which may for example comprise issuing a processor interrupt. Such interrupts may be processed in accordance with interrupt handling logic implementing a client-specified policy in some embodiments. Additional details regarding parameters of the BFRE algorithms in various embodiments are provided below. In at least some embodiments, the PRMS may implement additional resilience enhancement algorithms, not indicated in FIG. 1.

FIG. 2 illustrates the relationship between Hamming distance and the vulnerability of programs to memory errors involving the transformation of one legitimate value in memory to another legitimate value, according to at least some embodiments. Intended/original binary values 201 may be stored in a portion of a computing device's memory, e.g., a portion of memory representing a data structure element or entry within a program. In the simple 8-bit example shown, the original bit sequence is 10110010.

A bit-flip changes one of the values in the bit sequence from a 0 to a 1 or from a 1 to a 0. Among the bits used for values 201, bit-flip 205 has changed the fourth bit from the left from a 1 to a 0, for example. Such a bit-flip may in general occur at random bit positions or indexes due to natural causes such as cosmic radiation, power/temperature fluctuations. In some cases, bit-flips may occur due to malicious actions or attacks directed to computing systems. The modified binary values 209 resulting from a bit-flip can in general result in unexpected/undesired program behavior, especially if the bits were being used to store critical information used for managing the computing device (such as process state information, access permissions, etc.).

The lower half of FIG. 2 shows the bit sequences that may be used to store values of variants A and B within a given computer program. From within a given set of variants which includes A and B, one may be chosen as the value of a data structure entry or a variable of the program in some cases, e.g., using an enumeration data type or a Boolean data type. The Hamming distance between two bit sequences indicates the minimum number of bits that have to be changed in one of the bit sequences (e.g., by bit-flips) to transform that bit sequence into the other bit sequence. Variant A comprises the bit sequence 10110110, while variant B comprises the bit sequence 00111010. A may be transformed into B by changing the first, fifth, and sixth bits from the left, while keeping the remaining bits unchanged, so the Hamming distance 215 between A and B is 3 in the example shown in FIG. 2. In general, the probability that a given legitimate/acceptable value in a program (i.e., a value that was chosen by the programmer or by a compiler) is transformed into another legitimate/acceptable value as a result of bit-flips alone decreases as the Hamming distance between the legitimate values increases. In accordance with this intuition, a compiler may be employed to automatically ensure that respective values of a plurality of variants are selected with large Hamming distance separation between pairs of the variants in various embodiments for bit-flip resilience enhancement.

FIG. 3 illustrates an example use of enumerated (enum) data types to store important state information at a computing device, according to at least some embodiments. In section 302 of source code of an operating system, an enum data type called "State" is defined as consisting of three variants Invalid, Runnable and Running. The enum may be used to represent states of processes being managed by an operating system in the depicted embodiment. For example, the current states of up to 128 processes may be stored in the array processState. Respective numeric values (or more generally, bit sequences) may be generated by a compiler to represent each of the variants in the depicted embodiment. By default, i.e., if the compiler in use does not support variant value modifications for bit-flip enhancement, the bit sequences 0000 (represented as 0b000), 0001 and 0010 may be chosen for the variants Invalid, Runnable and Running. As such, the default Hamming distance between the enum variants is 1, as indicated in element 306.

One or two bit-flips could potentially change the apparent state of a given process being managed by the operating system, as indicated in element 308. After one bit-flip, a process that was placed in the Invalid state by the operating system may unexpectedly appear to be in Runnable state, a process that was in Running state may appear to be in Invalid or Runnable state, and so on. A pair of bit flips could change the state of a process from Runnable to Running state or vice versa. Such unintended (by the programmer) changes in the apparent states of the processes, caused by a single bit-flip or a pair of bit-flips, can potentially lead to significant problems or even crash the programs or the operating system itself in some cases, as indicated in element 310. To reduce the chances of occurrences of such problems, compilers may be used to choose variant values with larger Hamming distances between pairs of variants in at least some embodiments.

Figure 4:
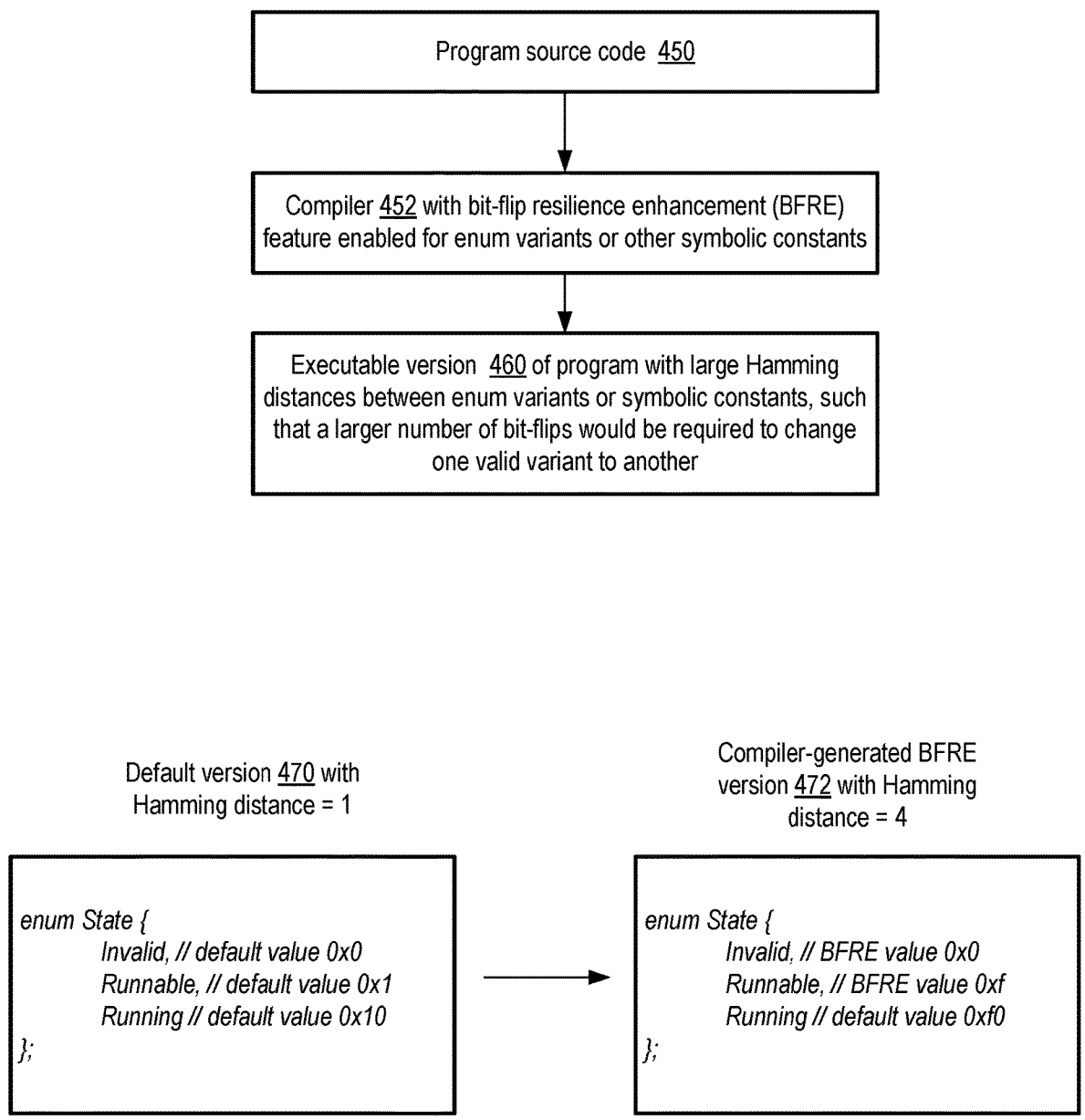
FIG. 4 illustrates example operations which may be performed by a compiler to enhance the resilience of programs using enum data types to bit-flips, according to at least some embodiments.

FIG. 4 illustrates example operations which may be performed by a compiler to enhance the resilience of programs using enum data types to bit-flips, according to at least some embodiments. Source code 450 of a program or a set of programs may be provided to a compiler 452 which has a BFRE feature enabled for enum variants (and/or for other sets of symbolic constants which may be used to select values to be assigned to variables or data structure entries).

The BFRE-enabled compiler 452 may generate an executable version 460 of the program with large Hamming distances between pairs of enum variants or symbolic constants, such that a larger number of bit-flips would be required to change one valid variant/constant into another in the depicted embodiment.

In a default version 470 of the executable version of the program, the Hamming distance between variants of the enum State may be 1, with Invalid being represented as hexadecimal value 0x0, Runnable being represented as 0x1, and Running being represented as 0x10. In a compiler-generated BFRE version 472 with a Hamming distance threshold of 4 selected, Invalid may be represented as 0x0, Runnable as 0xf, and Running as 0xf0. Thus, while a single bit-flip may have led to the transformation of a state from one legitimate value to another in the default version, at least four bit-flips may be required for an equivalent transformation in the compiler-generated BFRE version of the program in the depicted embodiment.

FIG. 5 illustrates example types of program locations at which a compiler configured to enhance resilience against bit-flips may insert code during compilation, according to at least some embodiments. At least three types of compiler-introduced BFRE-related code modifications 502 may be performed in the depicted embodiment. In the first type of modification, labeled 502A, the variants for an enum State defined in the program source code may each be assigned selected values such that the Hamming distance between any two variants exceeds a selected threshold. In the example scenario shown, variants of the State enum are used to populate an array processState comprising state information maintained about some number of processes launched by an operating system, and the names of the states are Invalid, Runnable and Running.

In a common programming pattern, a switch or case statement (or the logical equivalent of a switch, which may have a different name depending on the programming language in use) may be used to perform state-dependent operations in the depicted embodiment. In the "switch processState . . . " portion of the program source code shown in FIG. 5, code section A written by a programmer may be executed if the current state of the process being considered (the process whose state information is indicated at index "i" within the processState array) is Invalid, code section B written by the programmer may be executed if the current state of the process being considered is Runnable, and code section C may be executed if the current state of the process being considered is Running. Because the programmer may expect that no other values for the processState[i] array element are possible, in at least some cases the programmer may not write code for a "default" option for the switch statement. In at least one embodiment, the compiler may automatically insert executable code (instructions) 502B for a default portion of the switch statement. In these added-on executable instructions, the occurrence of potential bit-flips (and in some cases the specific value which is assigned to processState[i], which may provide a hint as to the number of bit-flips which may have occurred) may be logged, notifications indicating potential bit-flips may be generated, and/or policy-driven remedial actions may be initiated.

According to some embodiments, a BFRE-supporting compiler may also optionally add code or instructions 502C at one or more other places in the program where an enum variant is written or read. As in the case of code 502B, the added instructions may initiate remedial actions if the value of the variant is not among the values selected and assigned by the compiler. For example, if the values chosen for the three variants are 0x0, 0xf, and 0xf0, and the value stored in processState[i] is not among those three values at the position in the program corresponding to code 502C, instructions for operations similar to those performed in the default portion of the switch statement (corresponding to code 502B) may be inserted by the compiler. Other types of locations than those shown in FIG. 5 may be chosen by the compiler to insert code pertaining to the detection of bit-flips and/or to initiation of corresponding remedial actions in some embodiments.

Figure 6:
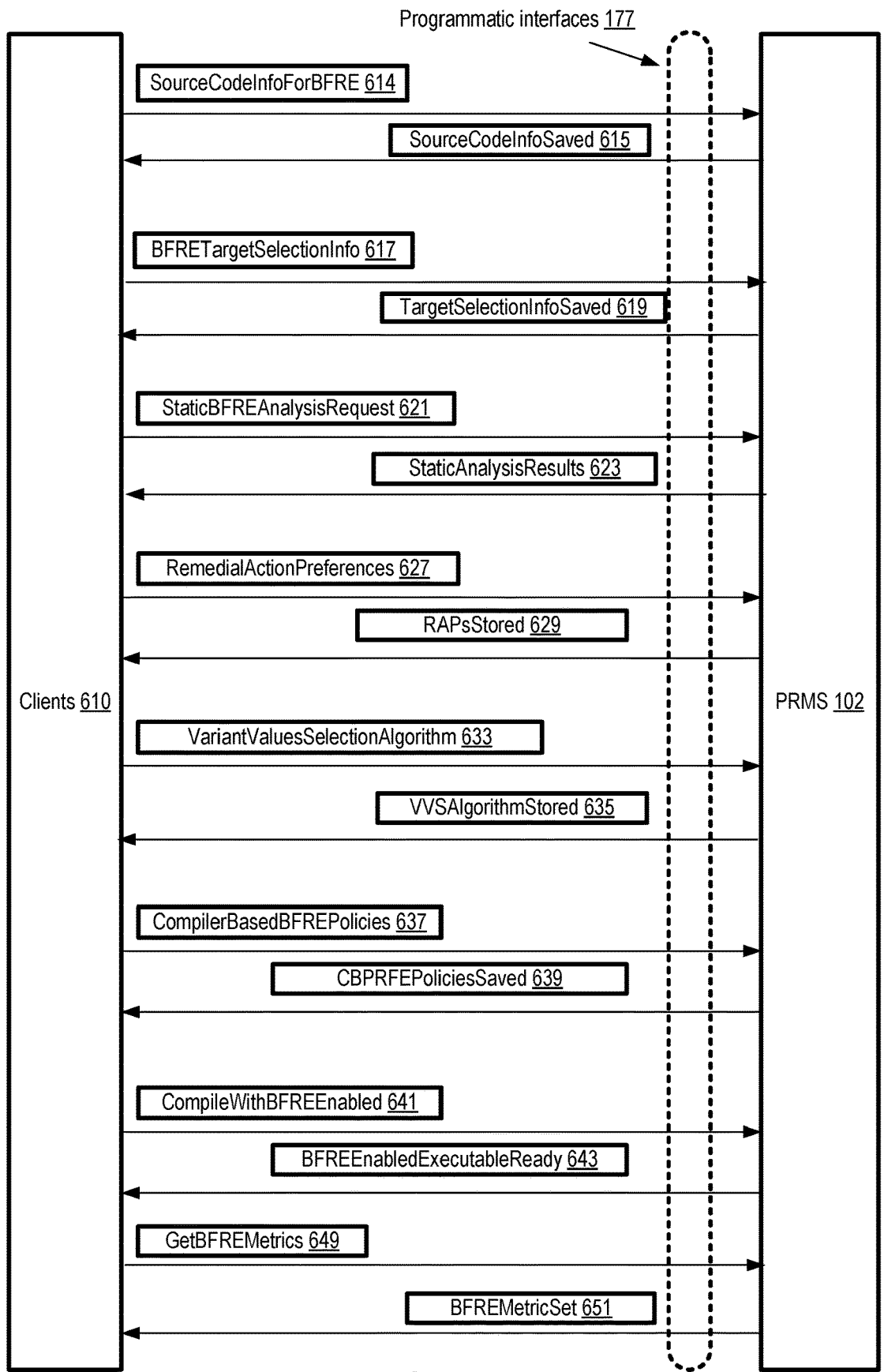
FIG. 6 illustrates example programmatic interactions associated with the use of compiler-based techniques for bit-flip resilience enhancement, according to at least some embodiments.

In at least some embodiments, clients of a program resilience management service may utilize programmatic interfaces provide preferences regarding the use of compiler-implemented enumerated-variant modification algorithms for their programs FIG. 6 illustrates example programmatic interactions associated with the use of compiler-based techniques for bit-flip resilience enhancement, according to at least some embodiments. Programmatic interfaces 177 supported by a PRMS 102 for client interactions may include, for example, APIs, command-line tools, graphical user interfaces, web-based consoles and the like in some embodiments.

Using the programmatic interfaces 177, clients 610 such as programmers, software development administrators, and/or program owners may provide information about the locations (e.g., file systems, code repositories, etc.) from which source code of the programs which are to be made more resilient to bit-flips can be accessed. One or more SourceCodeInfoForBFRE messages 614 may be sent by a client to provide such information in the depicted embodiment. The PRMS 102 may store the provided information and send a SourceCodeInfoSaved message 615 to the client in response. In some embodiments, the information provided by the client about the source code may indicate specific source code files whose code is to be made more resilient, or specific sub-trees of a source tree whose source code is to be made more resilient. In one embodiment, a client may indicate that the PRMS should make as many programs of an entire source code repository of the client more resilient to bit-flips as possible.

According to some embodiments, a client may indicate specific portions of one or more source code files within which enumerated variants that are to be made more resilient to bit-flips are defined, e.g., via a BFRETargetSelectionInfo message 617. In some embodiments, instead of specifying portions of the source code, compiler directives such as pragmas may be inserted by the client into the source code files, delineating the portions of the source code for which the compiler should generate variant values with large Hamming distances between pairs of variants. In one embodiment, a client may use a BFRETargetSelectionInfo message to indicate rules that the compiler can apply to determine which specific sets of enumerated variants should be modified by the compiler —e.g., such a rule may inform the compiler to search for accesses to enumeration data types within a set of source code files, and then choose values for the variants of those enumerations so as to reduce the impact of bit-flips. In one embodiment, the BFRETargetSelectionInfo message may request the PRMS to insert code at various places within the code (such as the default options for switch statements discussed above) to check validity of the variants at run-time. The information about targets of BFRE modifications may be stored at the PRMS, and a TargetSelectionInfoSaved message 619 may be sent to the client in some embodiments. In at least some embodiments, the PRMS 102 may analyze the source code in accordance with the target selection information provided by the client, and then send the client a list of proposed changes that the compiler can introduce for BFRE. If the client approves the proposed changes, the changes may be performed in such embodiments.

A client may sent a StaticBFREAnalysisRequest message 621 to the PRMS 102 in one embodiment, requesting the PRMS to perform a static analysis (prior to compilation) of a set of source code, and inform the client if (a) opportunities to enhance the code with regard to bit-flip impact can be found or (b) there are enumerated variants in the source code which could benefit from the compiler's selection of values, but the source code as written already specifies values for the enumerated variants (e.g., if the programmer has chosen respective values for the variants already, or specified numerical relationships among the variants). The requested static analysis may be performed, and a StaticAnalysisResults message 623 may be sent to the client from the PRMS, informing the client regarding the opportunities for BFRE changes and/or the cases where such changes would require overriding programmer choices. With regard to the opportunities that the PRMS identifies via static analysis, the client may then opt-in for the corresponding compiler-introduced changes if desired. With respect to the cases in which programmer-selected variant values or relationships would have to be overridden, the client may decide whether to change the code and allow the compiler to make BFRE-related changes to the changed code, or to leave the code as the programmer wrote it, without introducing BFRE modifications to those portions of the code in various embodiments. The decisions made by the client based on the results of the static analysis may be conveyed to the PRMS via programmatic interactions which are not shown in FIG. 6.

Guidelines or preferences regarding the kinds of remedial actions that should be initiated if bit-flips appear to have occurred may be provided by the client via one or more RemedialActionPreferences messages 627 in some embodiments. As indicated earlier, any of a variety of types of remedial actions may be requested, such as logging potential bit-flips, pausing/halting program execution, and so on. The preferences may be stored at the PRMS, and a RAPsStored message 629 may be sent to the client in some embodiments. In some embodiments, instead of a global set of preferences covering any and all potential bit-flips detected, a client may specify respective remedial actions for different portions of the source code or for different sets of enumerated variants.

In one embodiment, a client may specify an algorithm to be used to choose variant values such that Hamming distances between pairs of the variants exceed a threshold. Such an algorithm may be indicated via a VariantValuesSelectionAlgorithm 633. The PRMS may send back a VVSAlgorithmStored message 635 to the client to acknowledge that the variant selection algorithm has been received and will be utilized by the compiler. The algorithm's parameters may, for example, include the number of bits that are being used for the variants, the number of variants in the enumerated data type, the preferred minimum Hamming distance, etc. For a given variant size (the number of bits being used for the variants) and a given number of variants (e.g., three variants for the State enum utilized in the example shown in FIG. 5), the algorithm may generate respective values for each of the variants such that the Hamming distance between any two variants satisfies the minimum distance. In some embodiments, the algorithm specified by a client may simply provide a pre-selected or pre-computed list or set of values for the enumerated variants (e.g., 64 values may be indicated, so that values for any enumeration with no more than 64 variants can be obtained by the compiler from the list; for enumerations with more than 64 variants, the compiler may choose additional distinct values in such an example).

In some embodiments, a CompilerBasedBFREPolicies message 637 may be sent by a client, comprising a combination of parameters and preferences such as those that may otherwise be sent separately via SourceCodeInfoForBFRE, BFRETargetSelectionInfo, StaticBFREAnalysisRequest, RemedialActionPreferences, and VariantValuesSectionAlgorithm messages. A CBPRFEPoliciesSaved message 639 may be sent to the client to indicate that the policies have been received and will be implemented by the PRMS.

A Compile WithBFREEnabled request 641 may be sent to the PRMS requesting compilation of specified source code with the BFRE feature enabled at the compiler in the depicted embodiment. An executable version of the code may then be generated by the compiler, comprising for example the kinds of modifications shown in FIG. 5, and a BFREEnabledExecutableReady message 643 may be sent to the client. The executable version may be deployed to one or more target servers or other execution environments by the PRMS in some embodiments, and execution of the BRFE version of the code may be initiated at the client's request.

According to at least one embodiment, the PRMS may collect metrics pertaining to BFRE, such as the rate at which potential bit-flip occurrences have been detected over various time periods, the estimated average number of bit-flips per detection (e.g., whether a single bit-flip was detected in a given example where bit-flips appeared to have occurred, two bit-flips, three bit-flips, etc.), the distribution of bit-flips among a fleet of servers (which may for example indicate whether bit-flips are detected more frequently at some servers than others), and so on. In response to a GetBFREMetrics request 649, the client may be provided such metrics via one or more BFREMetricSet messages 651 in some embodiments. Note that compiler-implemented BFRE-related programmatic interactions other than those shown in FIG. 6 may be supported by a PRMS in some embodiments.

Figure 7:
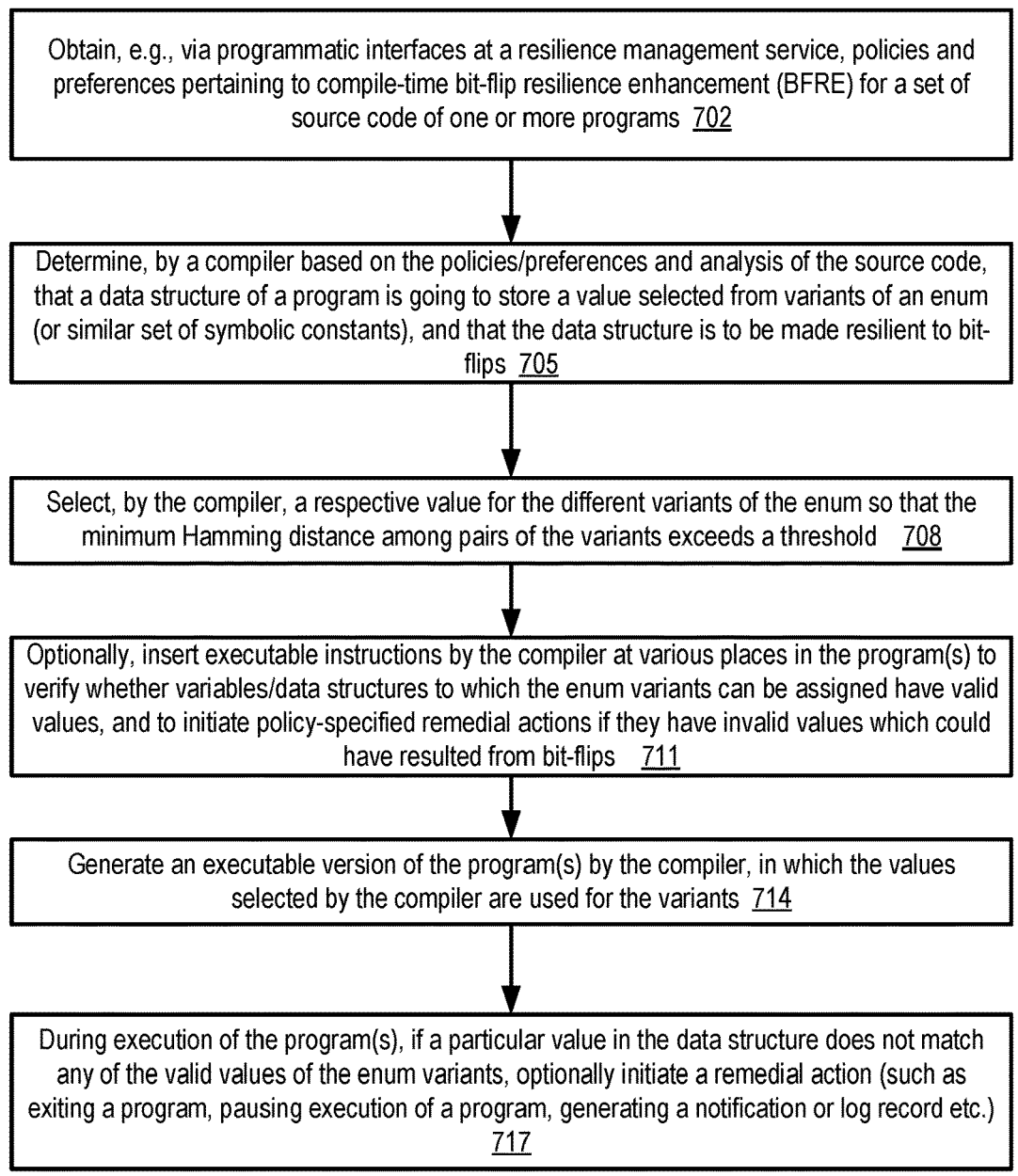
FIG. 7 is a flow diagram illustrating aspects of operations that may be performed to implement compile-time techniques to enhance bit-flip resilience, according to at least some embodiments.

FIG. 7 is a flow diagram illustrating aspects of operations that may be performed to implement compile-time techniques to enhance bit-flip resilience, according to at least some embodiments. As shown in element 702, policies and preferences pertaining to compile-time BFRE for a set of source code of one or more programs may be obtained or determined, e.g., via messages sent by a client using programmatic interfaces of a program resilience management service similar in features and functionality to PRMS 102 of FIG. 1.

Based on the policies or preferences, and/or on analysis of the source code, a compiler of the PRMS may determine that a data structure of a program is going to store a value selected from among a plurality of variants of an enum (or a similar plurality of symbolic constants), and that the data structure is to be made resilient to bit-flips in the depicted embodiment (element 705).

The compiler may select respective values for the different variants of the enum such that the minimum Hamming distance between pairs of the variants exceeds a threshold (e.g., a threshold indicated in a policy, or a threshold selected by the compiler) (element 708) in various embodiments.

Optionally, in some embodiments, as shown in element 711, the compiler may generate and insert executable code at various places in the program(s) (e.g., at locations similar to the example locations shown in FIG. 5) to verify that variables and/or data structures to which the enum variants can be assigned have valid values (i.e., values from among those selected by the compiler in operations corresponding to element 708). In some cases, the inserted executable code may initiate remedial actions if the variables or data structures have invalid values which could have resulted from bit-flips.

The compiler may generate an executable version of the program(s) in various embodiments, in which the values selected by the compiler may be used for the variants (element 714). Executable code added by the compiler in operations corresponding to element 711 may also be included in the program executable(s).

During an execution of the enhanced version of the program(s), if a particular value stored in the data structure does not match any of the valid values of the enum variants, a remedial action may be initiated in the depicted embodiment (element 717). The remedial action may for example include exiting a program or process, pausing execution of a program or process, generating a notification or log record, etc.

Figure 8:
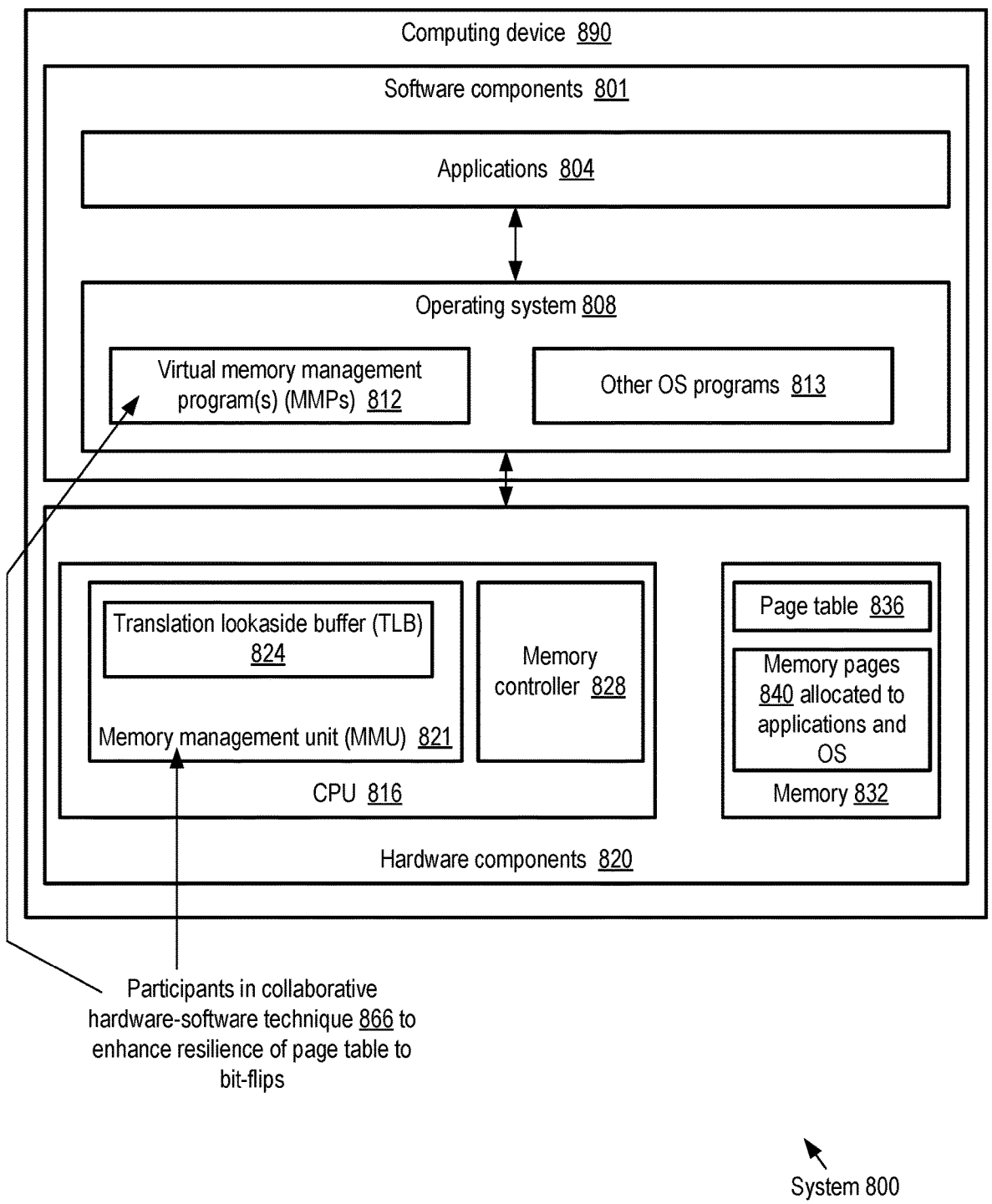
FIG. 8 illustrates example memory management components and data structures of a computing device which supports virtual memory, according to at least some embodiments.

In some embodiments, as indicated in the context of FIG. 1, a collaborative hardware-software technique for making critical data structures used for memory management tasks more resilient to bit-flips may be implemented, e.g., in addition to or instead of the compiler-based techniques described above. FIG. 8 illustrates example memory management components and data structures of a computing device which supports virtual memory, according to at least some embodiments. Virtual memory is a technique which enables the physical memory of a computing system to be shared efficiently among multiple processes, such that the sum of the memory allocated to the different processes by the operating system can exceed the size of the physical memory. The operating system, using a combination of hardware and software, maps memory addresses used by a process (called virtual addresses) into physical addresses within the physical memory. Virtual memory enables each process to have its own unique view of the computing device's memory.

System 800 may include computing device 890 with hardware components 820 and software components 801. The software components 801 may include applications 804 and an operating system 808. A given application may comprise one or more processes executing a program, with each process in turn comprising one or more threads. The operating system may comprise a collection of privileged programs/processes (programs or processes that have permissions that are not typically granted to end user application programs/process) such as one or more virtual memory management programs (MMPs) 812, as well as other OS programs 813. Hardware components 820 may comprise at least one CPU 816 and a physical memory 832. Physical memory 832 may be made up of one or more devices (such as Dynamic RAM devices), each such device organized as an array of memory cells. Each cell (which may comprise, for example, a byte with eight bits) has a unique physical address. Physical memory addresses are unique within the entire computing device, while virtual memory addresses may only be unique on a per-process basis. CPU 816 may include a memory management unit (MMU) 821 and a memory controller 828 in the depicted embodiment.

In system 800, only the operating system's programs (such as the MMPs) use or have access to physical memory addresses directly; user-space programs implementing applications 804 may use virtual addresses exclusively.

Translation from virtual to physical addresses may be accomplished using a combination of the MMPs, address translation hardware in the MMU, and a page table 836 (which may be stored in memory 832 or in persistent storage devices such as disks not shown in FIG. 8). The memory may also comprise memory pages 840 (e.g., with each page comprising some number of kilobytes of memory, such as 8 kilobytes, 16 kilobytes etc., with page sizes being chosen by the MMPs) allocated to applications and the OS itself. Conceptually, the page table 836 may be described as mapping virtual page numbers or page addresses to physical page numbers (also referred to as frame numbers); as discussed below in further detail, page tables may often be implemented as tree structures that are traversed (typically very frequently) by the MMU to determine the physical address corresponding to a given virtual address within the address space of a given process. To speed up address translation, a translation lookaside buffer 824 may be used to cache frequently-used or recently-used virtual-to-physical address translations in some embodiments. After a physical page number corresponding to a virtual page address is determined by the MMU (using the TLB, or using the page table), the memory controller may be utilized to access the contents of the physical page in various embodiments.

A page table may comprise a plurality of entries of different types in some embodiments, as discussed below in the context of FIG. 9. While some portions of a page table entry may comprise memory address information (e.g., addresses of entries at other levels of the page table, or addresses of physical pages), other portions may comprise attributes associated with memory address ranges, such as access permissions and the like, and still other portions may comprise so-called reserved or unused bits.

In various embodiments, a PRMS 102 (not shown in FIG. 8) may cause a dynamically-enabled technique 866 involving collaboration between an MMP and an MMU to be implemented to enhance the resilience of selected portions of the page table entries. In one such embodiment, an MMP 812 may be configured to identify a first subset of bits (such as bits used for storing attributes including access permissions) of a particular data structure entry whose resilience with respect to bit-flips is to be enhanced. The first subset of bits may be referred to as the to-be-protected bits herein. Such a data structure entry may for example be included within an address translation data structure (such as a page table) comprising a plurality of similar data structure entries that are traversed by the MMU to perform virtual-to-physical address translations. In accordance with the virtual memory management techniques and algorithms being implemented by the operating system, the MMP may store a first value (e.g., a value indicating that a particular process has permission to a particular page, with the address of the page stored in a different subset of bits of the entry) in the first subset of bits in various embodiments. The MMP may also store, within a second subset of bits of the same data structure entry, a second value derived from the first value in the depicted embodiment. The second value may for example be derived from the first value using a transformation algorithm such as a parity computation algorithm or a checksum computation algorithm. The second subset of bits may include one or more reserved or unused bits, defined as reserved or unused by a hardware architecture specification of the computing device in at least some embodiments.

The MMP (or some other OS component) may provide an indication to the MMU that values derived using the transformation algorithm are being stored in the second subset of bits of the data structure entries. In some embodiments, one or more processor registers may be used to inform the MMU that the algorithm is being used—e.g., a field stored in a register may indicate the specific algorithm being used, another field may indicate the bit index range of to-be-protected bits, and a third field may indicate the bit index range of the reserved bits within which the derived value is being stored. The MMU may access the registers to determine whether it (the MMU) is to apply the algorithm during its traversals.

During a subsequent traversal of the data structure entry after obtaining the indication, performed as part of its typical address translation duties, the MMU may apply the transformation function to the first subset of bits in various embodiments, and compare the result it obtains with the value stored in the second subset of bits. If the values do not match, this may indicate the occurrence of at least one bit-flip in the memory used for the data structure entry. In response to determining that the value currently stored in the second subset of bits does not match the result the MMU itself obtained from the transformation function, the MMU may cause a remedial action associated with detection of a bit-flip to be initiated in at least some embodiments. In one embodiment, for example, the MMU may generate a CPU interrupt, and the interrupt handler for that particular category of interrupts may cause the OS and/or one or more applications to terminate or pause execution, log records or other notifications of occurrence of bit-flips to be generated, and so on.

In various embodiments, the checking of the data structure entries' protected subsets of bits may be enabled or disabled dynamically. For example, if the computing device whose page table's resilience to bit-flips is being enhanced is a server of a computing service or data center, an administrator of the server (or a service customer to whom the server is assigned) may submit a programmatic request or command indicating that the checking is to be enabled or disabled. Upon determining that the checking is to be enabled, the operating system's MMP may (a) start generating and storing the derived values of the to-be-protected subset of bits and (b) notify the MMU, e.g., via a processor register or a set of processor registers, that the checking is enabled in some embodiments. Similarly, upon determining that the checking is to be disabled at the request of the administrator or customer, the MMP may notify the MMU that checking is disabled and then stop generating and storing the derived values. After it is informed that checking is disabled, the MMU may perform subsequent traversals of the page table without applying the transformation function.

In some embodiments, not all the bits (other than the reserved bits) of the data structure entry may be designated as to-be-protected. For example, access permission settings for a page of memory may be stored in the first subset of bits (which are the to-be-protected bits), the value derived from the first subset of bits may be stored in the second subset of bits, and a third subset of bits of the data structure entry may be used to store other data. Keeping the number of to-be-protected bits low, so that only the most important/critical portion of the entry are protected using the hardware-software collaborative technique, may help reduce the computational effort required from the MMP (and the MMU) to apply the transformation function in various embodiments.

Note that the collaborative software-hardware technique 866 for page table BFRE may be employed regardless of whether hardware-generated error correction codes (ECCs) are being stored for the memory of the computing device in various embodiments. As mentioned earlier, ECC may typically be used to detect no more than two errors in a particular sub-unit of memory, while the collaborative technique may be used to detect any number (up to the maximum number of to-be-protected bits) of bit-flips. Secondly, ECC may be a global technique, applied to the entire memory all the time, while the collaborative technique may be directed to protecting important subsets of data stored in particular data structures. The collaborative technique may be dynamically enabled or disabled, allowing administrators or users to decide when they want the extra protection against bit-flips. While the collaborative technique for making page tables more resilient to bit-flips can be implemented by MMPs and MMUs as described above, similar collaborative techniques may be applied to data structures other than page tables in some embodiments, e.g., in scenarios in which hardware units also traverse the data structures to perform tasks (analogous to virtual-to-physical address translation tasks) triggered or requested by the operating system.

Figure 9:
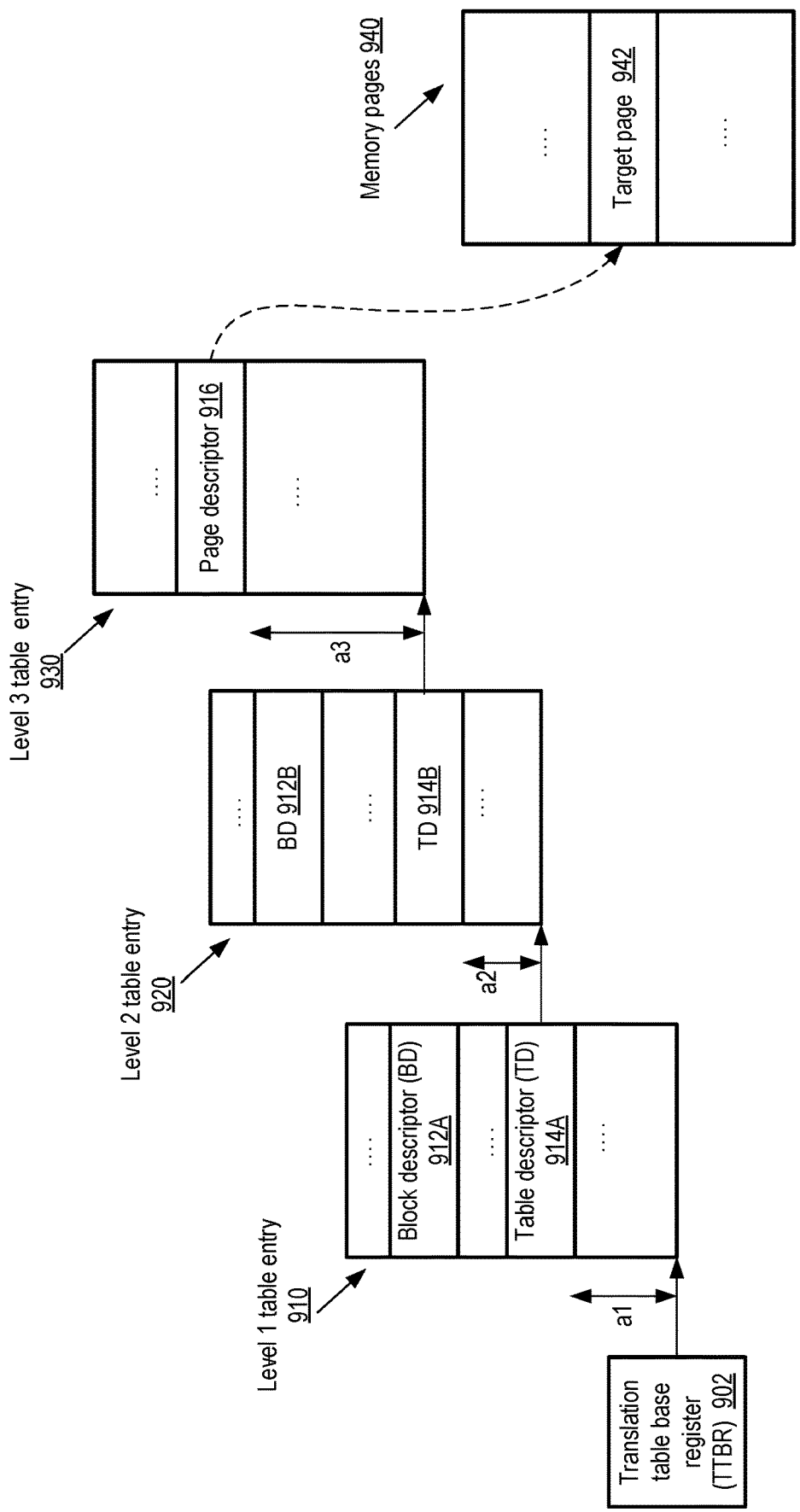
FIG. 9 illustrates an example multi-level page table which may be traversed frequently by a hardware memory management unit (MMU) of a computer system to perform virtual-to-physical address translation, according to at least some embodiments.

FIG. 9 illustrates an example multi-level page table which may be traversed frequently by a hardware memory management unit (MMU) of a computer system to perform virtual-to-physical address translation, according to at least some embodiments. A translation table base register (TTBR) 902 may point to a level 1 table entry 910 of the page table. The level 1 table may comprise some number of memory block descriptors (such as BD 912A) (where a block comprises more than one page) and one or more table descriptors (such as TD 914A) pointing to lower levels of the page table.

In the scenario depicted in FIGS. 9, a1, a2 and a3 represent respective portions of a virtual address (at different offsets within the bit sequence of the virtual address) which are used as indexes to traverse entries at different levels of the page table to determine the physical memory page to which the virtual address is mapped. For example, a1 may be used to access TD 914A, which points to level 2 table entry 920. Level 2 table entry may comprise BD 912B and TD 914B. Within level 2 table entry 920, a2 may be used to identify TD 914B, which points to level 3 table entry 930. Within the level 3 table entry, a3 may point to page descriptor 916, which points to the target page 942 within the memory pages 940 of the computing device for which the page table is used.

At least some contents of the page table entries at various levels may be written or populated by memory management programs (MMPs) of the kind discussed above in various embodiments e.g., when a new process is launched, when a memory mapping API (similar to mmap( )) is invoked at the operating system, when a memory un-mapping API (similar to munmap( )) is invoked, and so on. In embodiments in which the collaborative hardware-software BFRE technique is enabled, the MMP may also generate and store the derived values for the to-be-protected portion of the page table entries at one or more levels. Given a virtual address V for which a physical address is to be determined, the MMU may traverse one or more levels of the page table to determine the target or output physical address in various embodiments. In scenarios in which the collaborative hardware-software BFRE technique is enabled, the MMU may perform its checks at the entries at one or more of the levels of the page table. Note that at least in some embodiments, different subsets of the bits may be protected using the BFRE technique at respective levels of the tree—e.g., the to-be-protected bits may not necessarily be in the same bit index ranges in all the levels of the page table.

Figure 10:
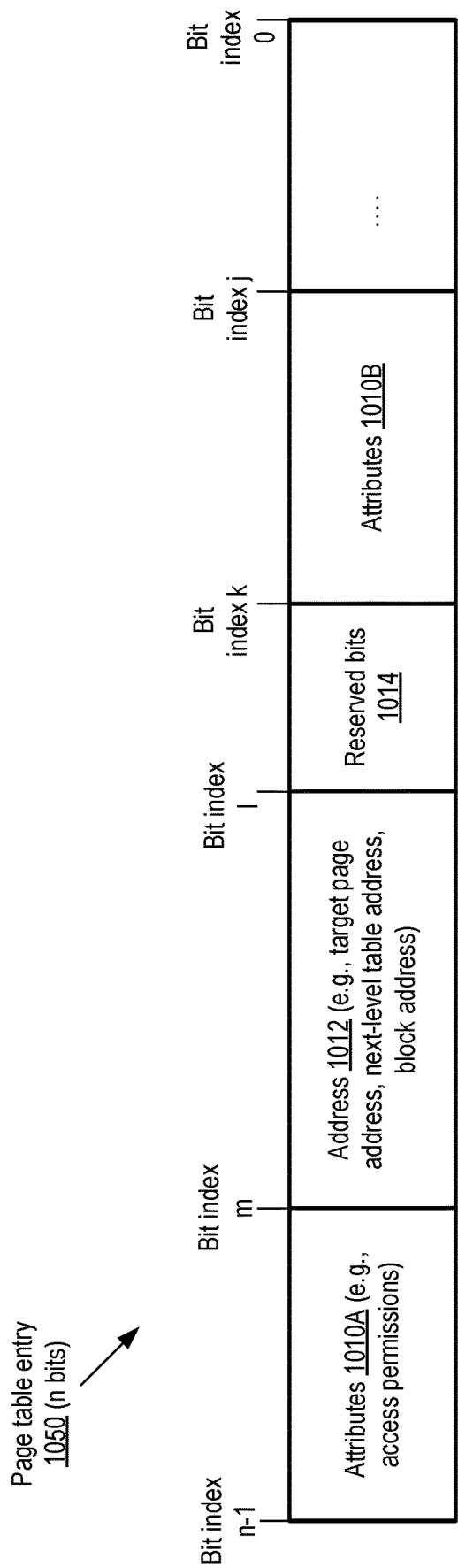
FIG. 10 illustrates example contents of a page table entry, according to at least some embodiments.

FIG. 10 illustrates example contents of a page table entry, according to at least some embodiments. In the example shown, page table entry 1050 comprises n bits, with bit indexes starting at 0 at the right end of the entry and leading up to index (n−1) at the left end. Address 1012, stored in bit index range l through m, may for example comprise a page address, the address of an entry of the next level in the table, or the address of a block (rather than a page) of memory, where a block can comprise multiple pages.

In page table entry 1050, a first set of attributes 1010A of the portion of memory being managed using the entry 1050 is stored in bit index range m through (n−1), while a second set of attributes 1010B is stored in bit index-range j through k. The bits between index k and index l have been designated as reserved bits 1014 in the hardware architecture specification of the computing device whose page table entry 1050 is shown. Other types of data may be stored between index 0 and index j in the depicted embodiment. Note that the architecture may in general specify different layouts (e.g., different subsets of bits being used for addresses vs. attributes) at respective layers of a multi-layer page table.

Figure 11:
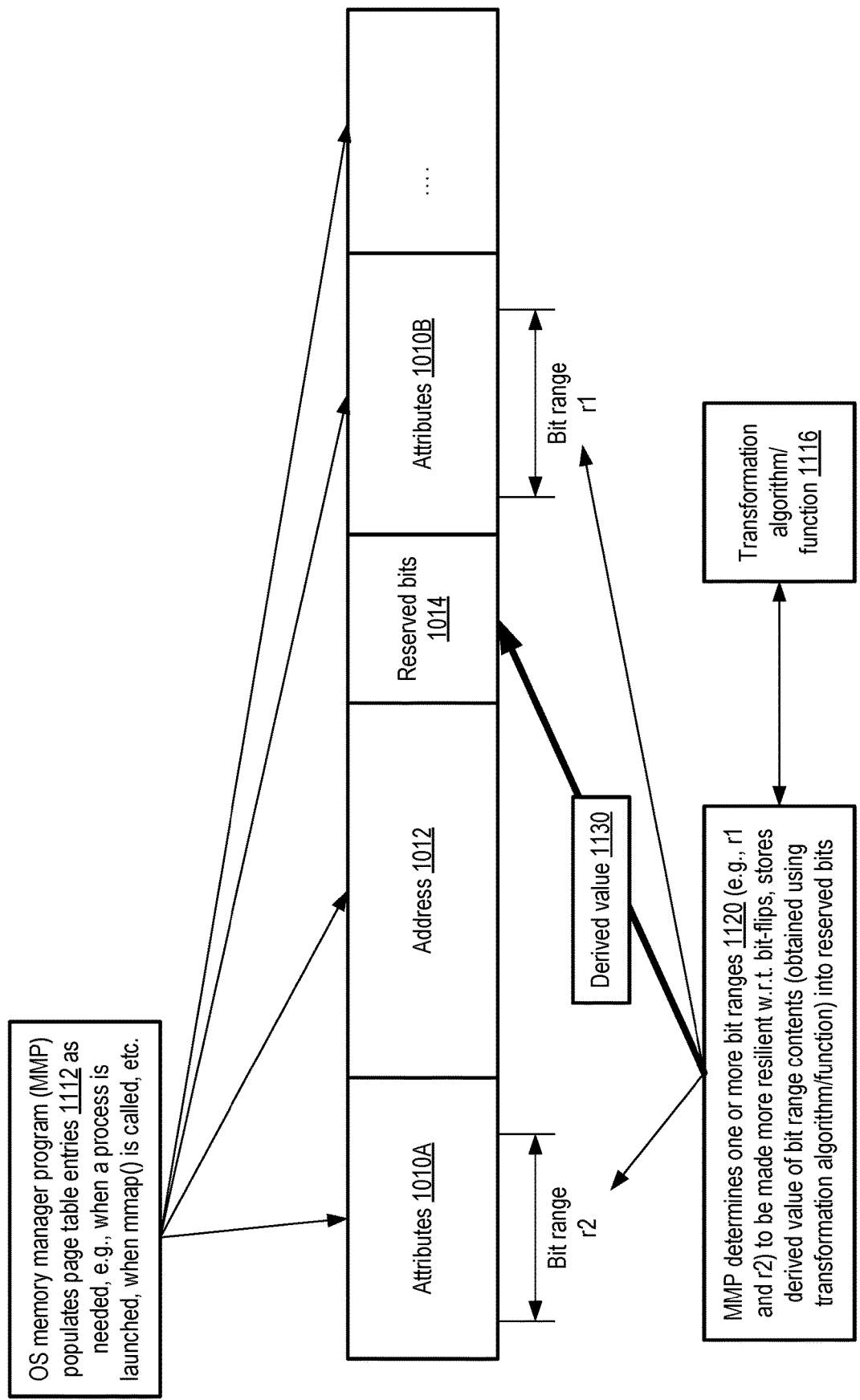
FIG. 11 illustrates example operations which may be performed by an operating system's virtual memory management program to enhance resilience of a page table to bit-flips in collaboration with an MMU, according to at least some embodiments.

FIG. 11 illustrates example operations which may be performed by an operating system's virtual memory management program to enhance resilience of a page table to bit-flips in collaboration with an MMU, according to at least some embodiments. In the example scenario, an OS MMP may populate or write data into page table entries 1112 as needed in accordance with the memory management algorithms of the OS, e.g., when a process is created, when a memory mapping/un-mapping request is received, and so on. The memory management algorithms may, for example, indicate how much memory is to be allocated for a given process when it is launched, the sizes of the pages allocated, and so on. The MMP may store attributes 1010A and 1010B, as well as address information 1012 in various embodiments, regardless of whether the collaborative BFRE algorithm introduced above is currently enabled or not.

If the collaborative algorithm is enabled or switched on (which may be determined by the MMP based on programmatic input received by the operating system), the MMP may do additional work in the depicted embodiment after storing attributes 1010A, 1010B and address 1012 in the depicted embodiment. The MMP may determine or identify one or more bit ranges 1120 (e.g., bit range r1 in attributes 1010B, and bit range r2 in attributes 1010A) which are to be made more resilient to bit-flips. A transformation algorithm/function 1116, such as a checksum generation algorithm, a parity generation algorithm or the like, may be applied to the to-be-protected bit ranges r1 and r2. The result obtained from the transformation algorithm may be referred to as the derived value 1130 corresponding to the to-be-protected bit ranges. The derived value may be stored in the reserved bits 1014 of the page table entry by the MMP. Note that while two bit ranges r1 and r2 within attributes 1010 and 1010B are shown as being protected in the example of FIG. 11, in general, any number of bits from anywhere in the page table entry (other than the reserved bits themselves) may be provided as input to the transformation algorithm in various embodiments. The specific bit ranges to be protected, and/or the algorithm used to generate the derived value, may be indicated via programmatic interfaces (e.g., in a BFRE policy specified by a customer or client of a service at which the collaborative algorithm is being implemented) to the OS in at least some embodiments.

Figure 12:
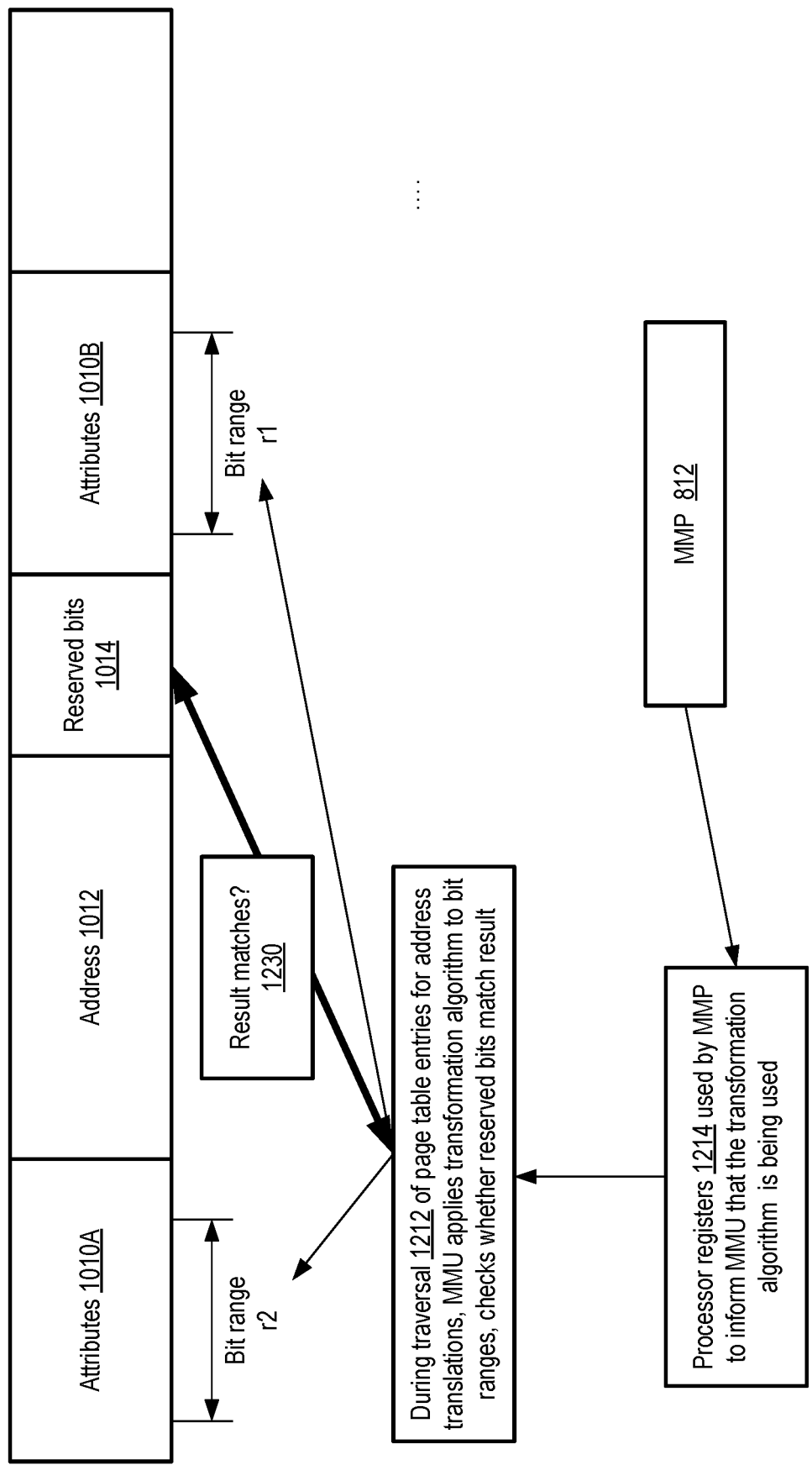
FIG. 12 illustrates example operations which may be performed by an MMU, working in collaboration with an operating system's virtual memory management program, to enhance resilience of a page table to bit-flips, according to at least some embodiments.

FIG. 12 illustrates example operations which may be performed by an MMU, working in collaboration with an operating system's virtual memory management program, to enhance resilience of a page table to bit-flips, according to at least some embodiments. An MMP 812 may use one or more processor registers 1214 to indicate to an MMU that derived values obtained by applying a transformation algorithm to one or more bit ranges (such as r1 and r2) of a page table's entries are being stored in reserved bits 1014 by the MMP in the depicted embodiment.

During its traversals 1212 of page table entries for virtual-to-physical address translations (which would be performed regardless of whether the collaborative hardware-software BFRE technique were enabled or not), the MMU may apply the transformation algorithm to the bit ranges, and check whether the reserved bits' contents match the result of the algorithm in various embodiments. If the result obtained by the MMU matches the contents of the reserved bits 1014 (element 1230 of FIG. 12), this may be taken as evidence that no bit-flips which require remedial actions have occurred since the MMP wrote the derived value. Note that in theory, multiple bit-flips whose net effect is to leave the original contents of the to-be-protected bit ranges and the reserved bots unchanged may in fact have occurred. For example, one of the bits of r2 may have been flipped from a 1 to a 0 and then flipped back to 1. Since such bit-flip combinations would make no difference to the intended functioning of the system, they may be ignored.

If the result obtained by the MMU from the transformation algorithm do not match the contents of the reserved bits, the MMU may cause one or more remedial actions associated with the occurrence of bit-flips to be initiated in the depicted embodiment. The mismatch may have occurred because the contents of bit ranges r1 and/or r2 have been modified by one or more bit-flips, or because the contents of the reserved bits 1014 have been modified by one or more bit-flips. In many implementations, the number of reserved bits used to store the derived value may typically be smaller than the total number of bits in the protected bit ranges r1 and r2, so the probability that a bit-flip causing the mismatch occurred in the protected bit ranges may be assumed to be higher than the probability that a bit-flip occurred in the reserved bits. In at least some embodiments, the remedial action may be initiated under the assumption that the bit-flips are more likely to have occurred in the protected bit ranges. A variety of remedial actions may be initiated in different embodiments, including for example generating an interrupt at a processor of the computing device for which the page table is being used. An interrupt handler may in turn cause additional remedial operations to be performed, such as causing a program to be terminated or paused, logging error messages, sending notifications to one or more destinations, and so on.

Figure 13:
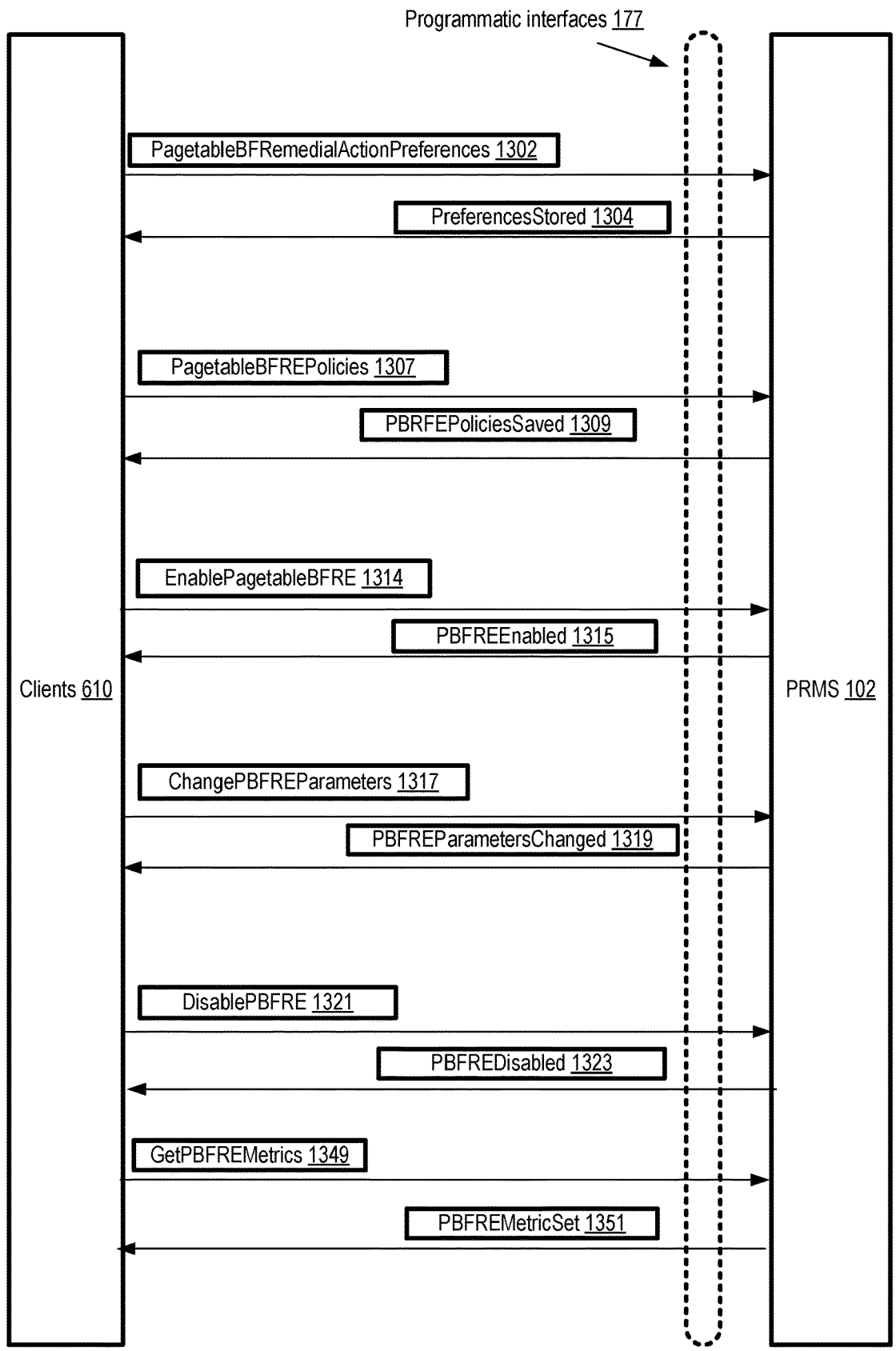
FIG. 13 illustrates example programmatic interactions associated with the use of collaborative hardware-software techniques for bit-flip resilience enhancement, according to at least some embodiments.

FIG. 13 illustrates example programmatic interactions associated with the use of collaborative hardware-software techniques for bit-flip resilience enhancement, according to at least some embodiments. Clients 610 of a PRMS 102 (such as administrators of servers whose page tables are to be made more resilient to bit-flips, or clients of a cloud provider network whose applications are run on such servers) may use programmatic interfaces 177 to provide preferences or policies for BFRE of page tables and other similar data structures in the depicted embodiment. A client may submit a PagetableBFRemedialActionPreferences message 1302 to the PRMS to indicate the kinds of remedial actions they wish to execute in the event that an MMU detects the possible occurrence of bit-flips. The PRMS may store the preferences in a repository of metadata, and send a PreferencesStored message 1304 to the client in some embodiments.

In some embodiments, a client may submit a PagetableBFREPolicies message 1307, indicating policies to be implemented on behalf of the client with respect to various aspects of the collaborative hardware-software BFRE technique. The policy may indicate, for example, the specific kinds of data (such as memory access permissions) which are to be protected, whether the technique should be enabled by default at various computing devices or only upon request, the transformation algorithm to be applied to the to-be-protected data, the frequency with which the MMU should check whether the derived values match the results obtained by the MMU itself (e.g., whether the MMU should perform such checks every time it accesses a page table entry, every Nth time it accesses a page table entry, or during randomly selected accesses), and so on. Remedial action preferences may also be indicated in the policies in some embodiments. The policies may be stored by the PRMS, and a PBFREPoliciesSaved message 1309 may be sent to the client in at least some embodiments.

The collaborative hardware-software technique may be enabled dynamically by a client at one or more targeted computing devices by sending an EnablePagetableBFRE request 1314 in the depicted embodiment. In response, the PRMS may cause the MMPs at the targeted devices to receive a signal or message to start generating and storing the derived values for the to-be-protected bits, and to inform the MMU that it is to start verifying whether the reserved bits still contain the derived value generated by the MMU when it traverses the page table. A PBFREEnabled message 1315 may be sent to the client to indicate that the technique has been switched on.

If desired, a client may modify one or more parameters of the technique by sending a ChangePBFREParameters request 1317 to the PRMS in some embodiments. The requested modification may, for example, result in a change to the bit index ranges of the to-be-protected bits, a change in how often the MMU checks the values in the reserved bits, and so on. The requested changes may be stored and applied dynamically in the depicted embodiment at the computing devices at which the collaborative technique is being implemented, and a PBFREParametersChanged message 1319 may be sent to the client to indicate that the changes have been made.

The collaborative hardware-software technique may be disabled dynamically at one or more targeted computing devices by sending a DisablePagetableBFRE request 1321 in various embodiments. In response, the PRMS may cause the MMPs at the targeted devices to receive a signal or message to inform the MMU to stop trying to match the values stored in the reserved bits with the result of applying a transformation algorithm to the bits which were being protected earlier. The MMP may also stop generating and storing the derived values for the to-be-protected bits. A PBFREDisabled message 1323 may be sent to the client to indicate that the technique has been switched on. In some embodiments, e.g., if indicated by the client via a parameter of the DisablePBFRE request, the checking of the reserved bits by the MMU may be disabled, but the MMP may continue generating and storing the derived values in the reserved bits.

According to at least one embodiment, the PRMS may collect metrics pertaining to page table BFRE, such as the rate at which potential bit-flip occurrences have been detected at the page table over various time periods, the estimated average number of bit-flips per detection (e.g., whether a single bit-flip was detected in a given example where bit-flips appeared to have occurred, two bit-flips, three bit-flips, etc.), the distribution of bit-flips among a fleet of servers (which may for example indicate whether bit-flips are detected more frequently at some servers than others), and so on. In response to a GetPBFREMetrics request 1349, the client may be provided such metrics via one or more PBFREMetricSet messages 1351 in some embodiments.

Other programmatic interactions associated with the collaborative technique may be supported by a PRMS in some embodiments than those shown in FIG. 13. Note that in some embodiments, a PRMS may support both compiler-implemented BFRE, as well as the collaborative BFRE technique for page tables. As such, the PRMS may support programmatic interactions pertaining to both techniques (such as those shown in FIG. 6 as well as FIG. 13) in such embodiments.

Figure 14:
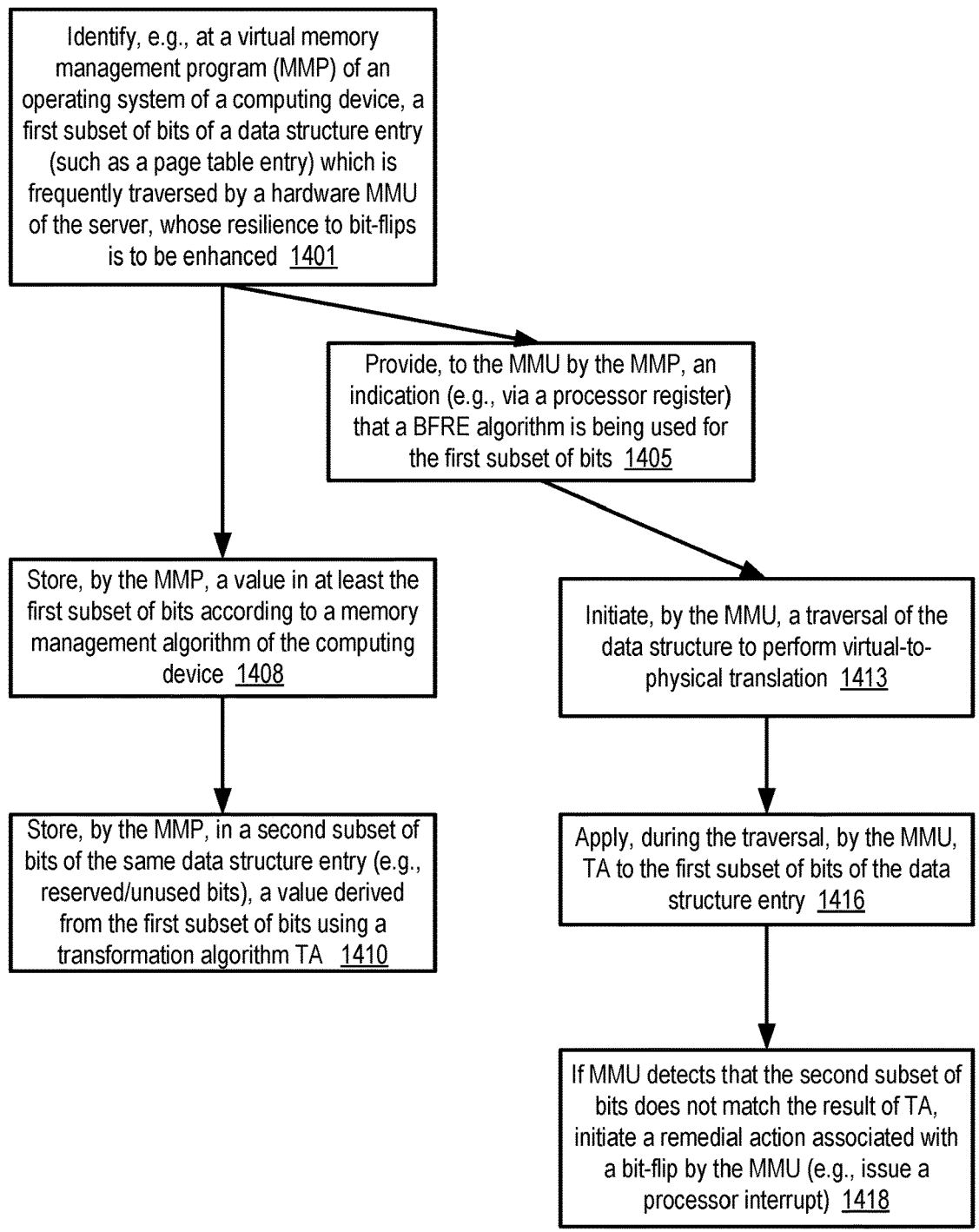
FIG. 14 is a flow diagram illustrating aspects of operations that may be performed to implement collaborative hardware-software techniques to enhance bit-flip resilience, according to at least some embodiments.

FIG. 14 is a flow diagram illustrating aspects of operations that may be performed to implement collaborative hardware-software techniques to enhance bit-flip resilience, according to at least some embodiments. As indicated in element 1401, a virtual memory management program (MMP) of an operating system of a computing device may identify a first subset of bits of a data structure entry whose resilience to bit-flips is to be enhanced. The data structure entry may for example comprise a page table entry or some other memory management data structure which is frequently traversed by a hardware unit such as an MMU to perform virtual-to-physical address translations.

The MMP (or some other operating system program) may provide an indication (e.g., via one or more processor registers) to the MMU that a BFRE algorithm is being used to protect the first subset of bits in various embodiments (element 1405). As part of implementation of the regular or standard memory management algorithms of the computing device, the MMP may store a value in the first subset of bits (element 1408). Such values may for example indicate various attributes as well as addresses of memory allocations, such as access permissions and the like, and may be determined or selected for writing into the first subset of bits when a new process is launched, when a memory map request is received at the MMP from an application program, when a memory un-map request is received at the MMP, and so on.

In addition to storing a particular value in the first set of bits, the MMP may also store a second value in a second subset of bits of the same data structure entry in various embodiments (element 1410). The second subset of bits may, for example, include one or more bits designated as "reserved" or unused bits in a hardware architecture specification of the computing device which defines the layouts of page tables and other similar data structures. The second value may be derived by the MMP from the value stored in the first subset of bits using a transformation algorithm (TA) in various embodiments. As part of its regular duties, the MMU may initiate a traversal of the data structure to perform a particular virtual-to-physical address translation (triggered for example as a result of a request from the MMP) (element 1413). During the traversal, the MMU may apply the transformation algorithm TA to the first subset of bits (element 1416). If the MMU detects that the value currently stored in the second subset of bits does not match the result the MMU obtained from the TA, the MMU may initiate a remedial action associated with occurrence of a bit-flip in various embodiments (element 1418). For example, the MMU may cause a processor interrupt, and an interrupt handler of that interrupt (which may have been set up based on a policy indicated by an administrator of the computing device) may cause the execution of one or more programs to be terminated or paused, send notifications indicating the occurrence of bit-flips to one or more destinations, cause log records indicating bit-flips to be generated and stored, and so on. It is noted that in various embodiments, some of the operations shown in the flow diagrams of FIG. 7 and/or FIG. 14 may be implemented in a different order than that shown in the figure, or may be performed in parallel rather than sequentially. Additionally, some of the operations shown in FIG. 7 and/or FIG. 14 may not be required in one or more implementations.

Figure 15:
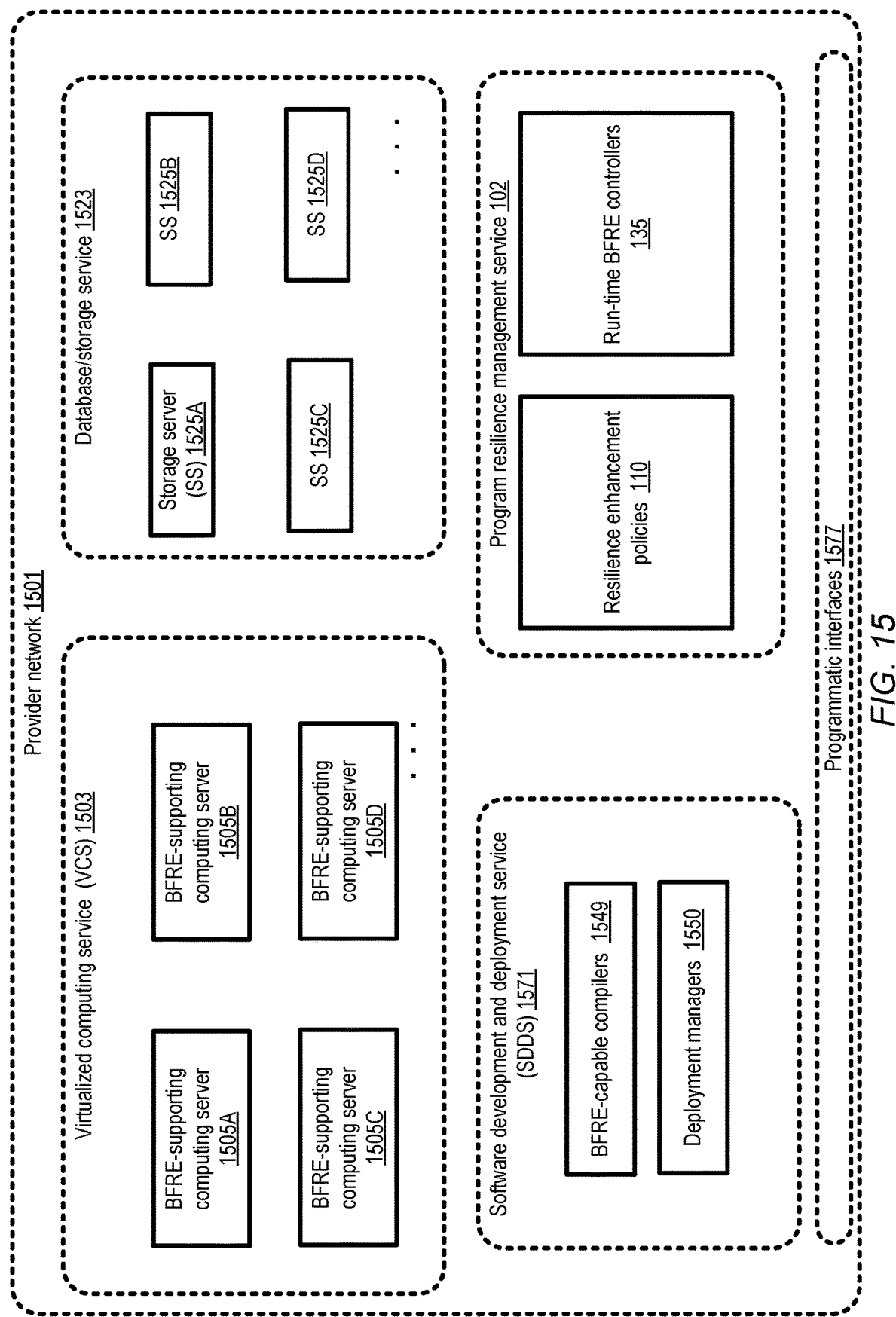
FIG. 15 illustrates an example provider network environment, according to at least some embodiments.

As mentioned above, a PRMS may be implemented at a cloud computing environment or cloud provider network in some embodiments. FIG. 15 illustrates an example provider network environment, according to at least some embodiments. In the depicted embodiment, provider network 1501 may comprise resources used to implement a plurality of network-accessible services, including for example a virtualized computing service (VCS) 1503, a database/storage service 1523, a software development and deployment service (SDDS) 1571 as well as PRMS 102. The PRMS 102 may store resilience enhancement policies 110 provided by PRMS clients as well as default policies of the PRMS, run-time BFRE controllers 135, and a set of BFRE tools in the depicted embodiment. At the request of PRMS clients, a compiler-implemented enumerated-variant modification algorithm of the kind introduced above may be executed on various types of programs, and/or a collaborative OS-MMU algorithm for page tables of various servers and computing devices of the provider network may be implemented in the depicted embodiment.

In some embodiments, the SDDS 1571 may comprise BFRE-enabled compilers 1549 for various programming languages, which may be invoked by the PRMS on behalf of PRMS clients to produce executable versions of programs which have been modified to enhance resilience to bit-flips. Deployment managers 1550 of the SDDS may then be employed to deploy the executable versions to desired execution environments such as virtual machines or compute instances running on computing servers of the VCS.

At least some of the computing servers of the VCS may support BFRE, in that they may comprise operating systems and MMUs that can implement the collaborative technique introduced earlier for enhancing resilience of page tables and other similar data structures. Such BFRE-supporting computing servers 1505 (such as 1505A, 1505B 1505C or 1505D) may in some embodiments be used to run compute instances whose operating systems have been compiled using the BFRE-capable compilers, and to run applications within the compute instances which have also been compiled using the BFRE-capable compilers. As such, several levels of BFRE may be performed at the VCS: the collaborative hardware-software technique may be used for page tables, the operating systems may be enhanced using BFRE-capable compilers, and applications may also be enhanced using the BFRE-capable compilers. Similarly, components of other provider network services, such as storage servers (SS) 1525A-1525D of database/storage service 1523 may also utilize one or more of the types of BFRE techniques introduced above in the depicted embodiment. Components of a given service of a provider network may utilize components of other services in the depicted embodiment—e.g., run-time BFRE controllers 135 may comprise compute instances of the VCS, policies 110 may be stored at storage servers 1525, and so on. Individual ones of the services shown in FIG. 15 may implement a respective set of programmatic interfaces 1577 which can be used by external and/or internal clients (where the internal clients may comprise components of other services) in the depicted embodiment. In at least some embodiments, resources of a cloud provider network may not be required for the kinds of BFRE techniques introduced above; instead, for example, a standalone set of tools may be used.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, a PRMS may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as provider network extension sites or local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

A VCS of the cloud provider network may offer virtual compute instances (also referred to as virtual machines, or simply "instances") with varying computational and/or memory resources in various embodiments, which may be used to implement a PRMS as indicated above. In one embodiment, each of the virtual compute instances may correspond to one of several instance types or families, and instances of any of several families may be employed for computations of the PRMS. An instance type may be characterized by its hardware type, computational resources (e.g., number, type, and configuration of central processing units [CPUs] or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The traffic and operations of the cloud provider network, and individual services such as the PRMS, may broadly be subdivided into two categories in various embodiments: control plane operations and data plane operations. While the data plane represents the movement of data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 16:
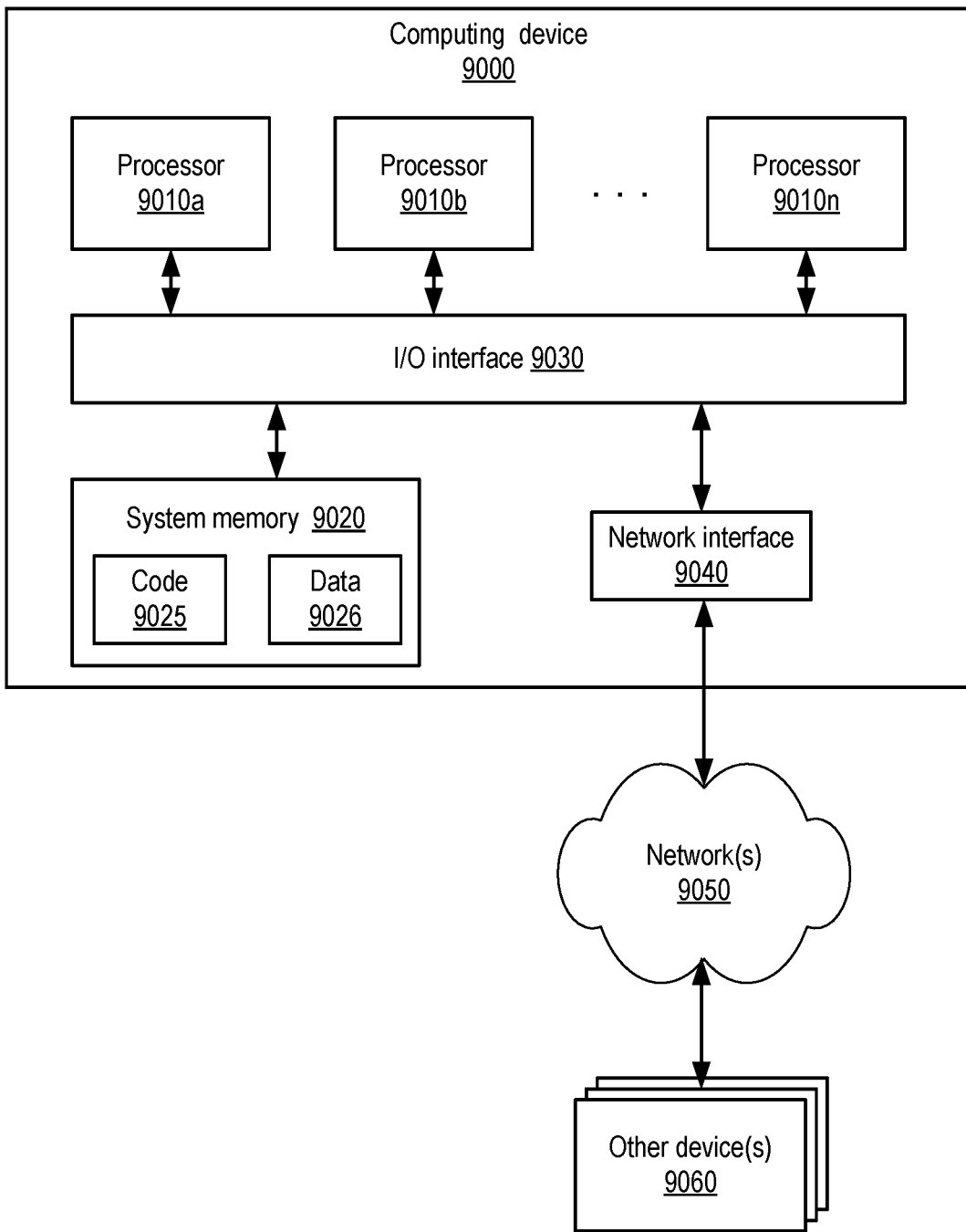
FIG. 16 is a block diagram illustrating an example computing device that may be used in at least some embodiments.

In at least some embodiments, a server that implements the types of techniques described herein (e.g., BFRE algorithms of the kind discussed above, or various functions of a PRMS and/or other services of a provider network), may include a general-purpose computer system that includes or is configured to access one or more computer-accessible media. FIG. 16 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 15, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 15. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a memory management program of an operating system of a computing device; and
a hardware memory management unit of the computing device;
wherein the memory management program is configured to:
identify a first subset of bits of a particular data structure entry, wherein resilience of the first subset of bits to bit-flips is to be enhanced, and wherein the particular data structure entry is included within an address translation data structure comprising a plurality of data structure entries that are traversed by the hardware memory management unit to perform virtual-to-physical address translations; and
store, within the first subset of bits, a first value selected in accordance with a memory management algorithm of the computing device; and
store, within a second subset of bits of the particular data structure entry, a second value derived from the first value using a transformation algorithm, wherein the second subset of bits comprises one or more reserved bits indicated in a hardware architecture specification of the computing device; and
wherein the hardware memory management unit is configured to:
obtain an indication that the transformation algorithm is being used by the memory management program to generate values stored in the second subset of bits; and
during a first traversal of the particular data structure entry to perform a virtual-to-physical address translation,
apply the transformation algorithm to the first value; and
in response to detecting that a particular value stored in the second subset of bits does not match a result of applying the transformation algorithm, cause a remedial action associated with a detection of a bit-flip to be initiated.

2. The system as recited in claim 1, wherein the hardware memory management unit is further configured to:
subsequent to obtaining an indication that checking of data structure entries of the address translation data structure using the transformation algorithm has been disabled, perform a second traversal of the particular data structure entry without applying the transformation algorithm to the first value.

3. The system as recited in claim 1, wherein the transformation algorithm comprises one or more of: (a) a checksum computation or (b) a parity computation.

4. The system as recited in claim 1, wherein the particular data structure entry comprises a third subset of bits, wherein the transformation algorithm is not applied to the third subset of bits.

5. The system as recited in claim 1, wherein the first subset of bits comprise an access permission of a particular portion of memory of the computing device.

6. A computer-implemented method, comprising:
identifying, by an operating system program of a computing device, a first subset of bits of a particular data structure entry, wherein resilience of the first subset of bits to bit-flips is to be enhanced, and wherein the particular data structure entry is included within a data structure comprising a plurality of data structure entries that are traversed in hardware by a hardware unit of the computing device distinct from the operating system program to perform one or more tasks;
storing, by the operating system program within a second subset of bits of the particular data structure entry, a value derived from the first subset of bits using an algorithm;
applying, by the hardware unit in hardware instead of the operating system program, during a first hardware traversal of the particular data structure entry, the algorithm to the first subset of bits; and
in response to detecting, by the hardware unit in hardware, that a value stored in the second subset of bits does not match a result obtained from applying the algorithm, causing a remedial action to be initiated.

7. The computer-implemented method as recited in claim 6, wherein the remedial action comprises one or more of: (a) generating an interrupt at the computing device, (b) causing an exit of a program running at the computing device, (c) pausing execution of a program running at the computing device, or (d) generating a notification indicating an occurrence of one or more bit-flips.

8. The computer-implemented method as recited in claim 6, further comprising:
determining, by the hardware unit from one or more processor registers of the computing device prior to applying the algorithm to the first subset of bits, that the hardware unit is to apply the algorithm during the first traversal.

9. The computer-implemented method as recited in claim 6, further comprising:
in response to determining, by the hardware unit after completing the first traversal, that checking of contents of the data structure using the algorithm has been disabled, completing a second traversal of the particular data structure entry by the hardware unit without applying the algorithm.

10. The computer-implemented method as recited in claim 6, further comprising:
prior to the storing of the value, receiving, at the computing device, an indication via a programmatic interface that checking of contents of the data structure using the algorithm is to be initiated, wherein the storing of the value is performed in response to the indication received via the programmatic interface.

11. The computer-implemented method as recited in claim 6, wherein the first subset of bits comprises an indication of an access permission.

12. The computer-implemented method as recited in claim 6, wherein the algorithm comprises one or more of: (a) a checksum algorithm or (b) a parity algorithm.

13. The computer-implemented method as recited in claim 6, wherein the data structure is stored in a memory of the computing device for which error-correcting codes (ECC) are not generated.

14. The computer-implemented method as recited in claim 6, wherein the computing device comprises a server of a computing service of a cloud computing environment.

15. The computer-implemented method as recited in claim 6, wherein the data structure comprises a page table.

16. A computing device, comprising:
a memory; and
a hardware memory management unit;
wherein the hardware memory management unit is configured to:
obtain an indication that an algorithm is being used by a program running at the computing device to generate, for storage by the program within a first subset of bits of a particular data structure entry of a plurality of data structure entries of an address translation data structure, a value from a second subset of bits of the data structure entry, wherein the address translation data structure is used for hardware translation of virtual addresses to physical addresses of the memory;
apply, during a traversal in hardware of the particular data structure entry performed by the hardware memory management unit to translate a virtual address to a physical address, the algorithm to the second subset of bits; and
in response to detecting that a value stored in the first subset of bits does not match a result of applying the algorithm, cause a remedial action associated with one or more bit-flips to be initiated.

17. The computing device as recited in claim 16, wherein the memory stores a hardware-generated error correction code (ECC) for a portion of the memory in which the particular data structure entry is stored.

18. The computing device as recited in claim 16, further comprising a processor register, wherein to obtain the indication that the algorithm is being used, the hardware memory management unit is further configured to access the processor register.

19. The computing device as recited in claim 16, wherein the remedial action comprises generating an interrupt to a processor of the computing device.

20. The computing device as recited in claim 16, wherein the second subset of bits indicate an access permission to a portion of the memory.

* * * * *